R. A. JONES.
WRAPPING AND LABELING MACHINE.
APPLICATION FILED FEB. 27, 1911.

1,162,611.

Patented Nov. 30, 1915.
19 SHEETS—SHEET 1.

Witnesses

Inventor
R. A. Jones,
By John H. Holt
his Attorney

R. A. JONES.
WRAPPING AND LABELING MACHINE.
APPLICATION FILED FEB. 27, 1911.

1,162,611.

Patented Nov. 30, 1915.
19 SHEETS—SHEET 5.

Fig. 14.

Witnesses
Helge O. F. Murray
E. G. Marshall

Inventor
R. A. Jones
By John H. Holt
his Attorney

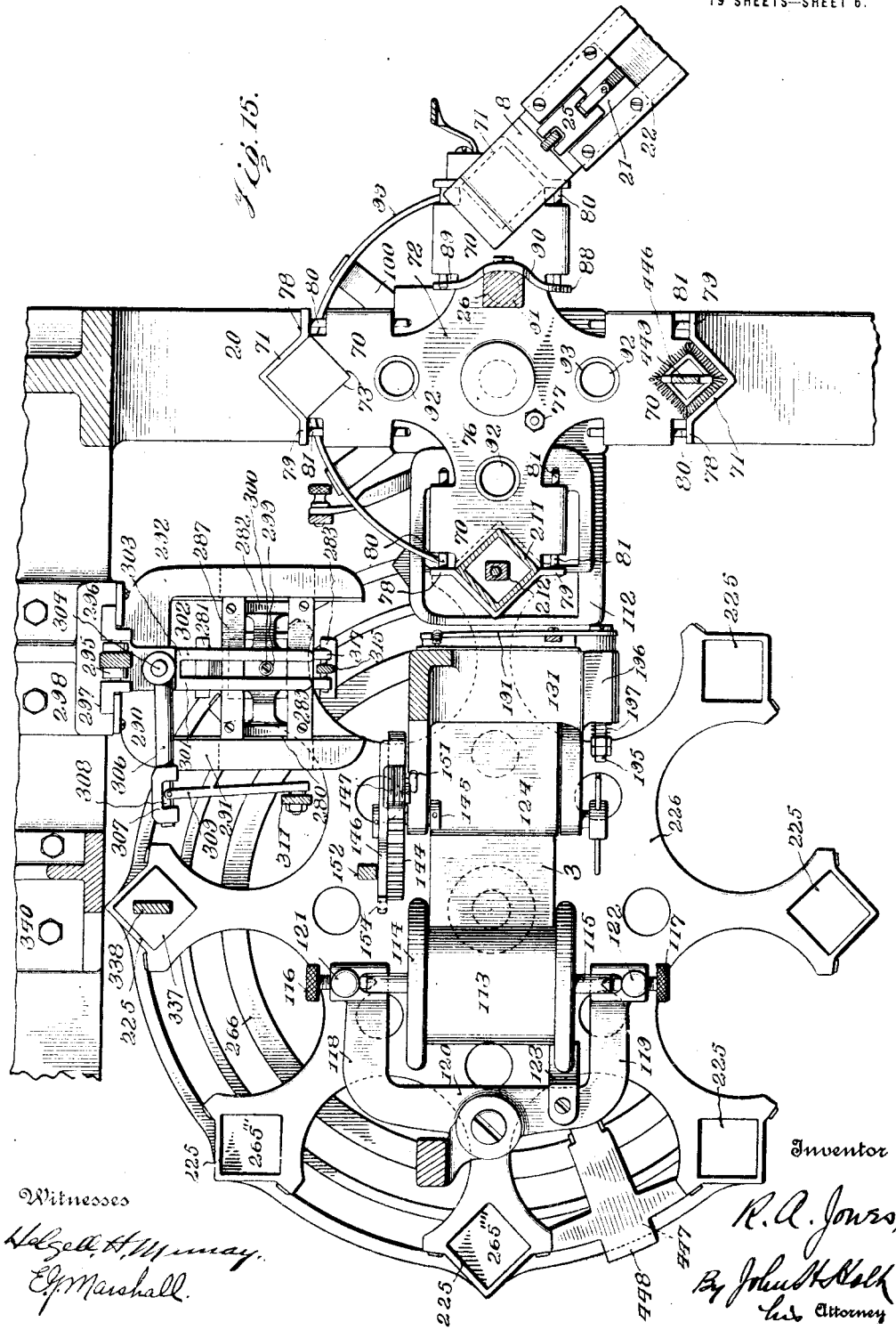

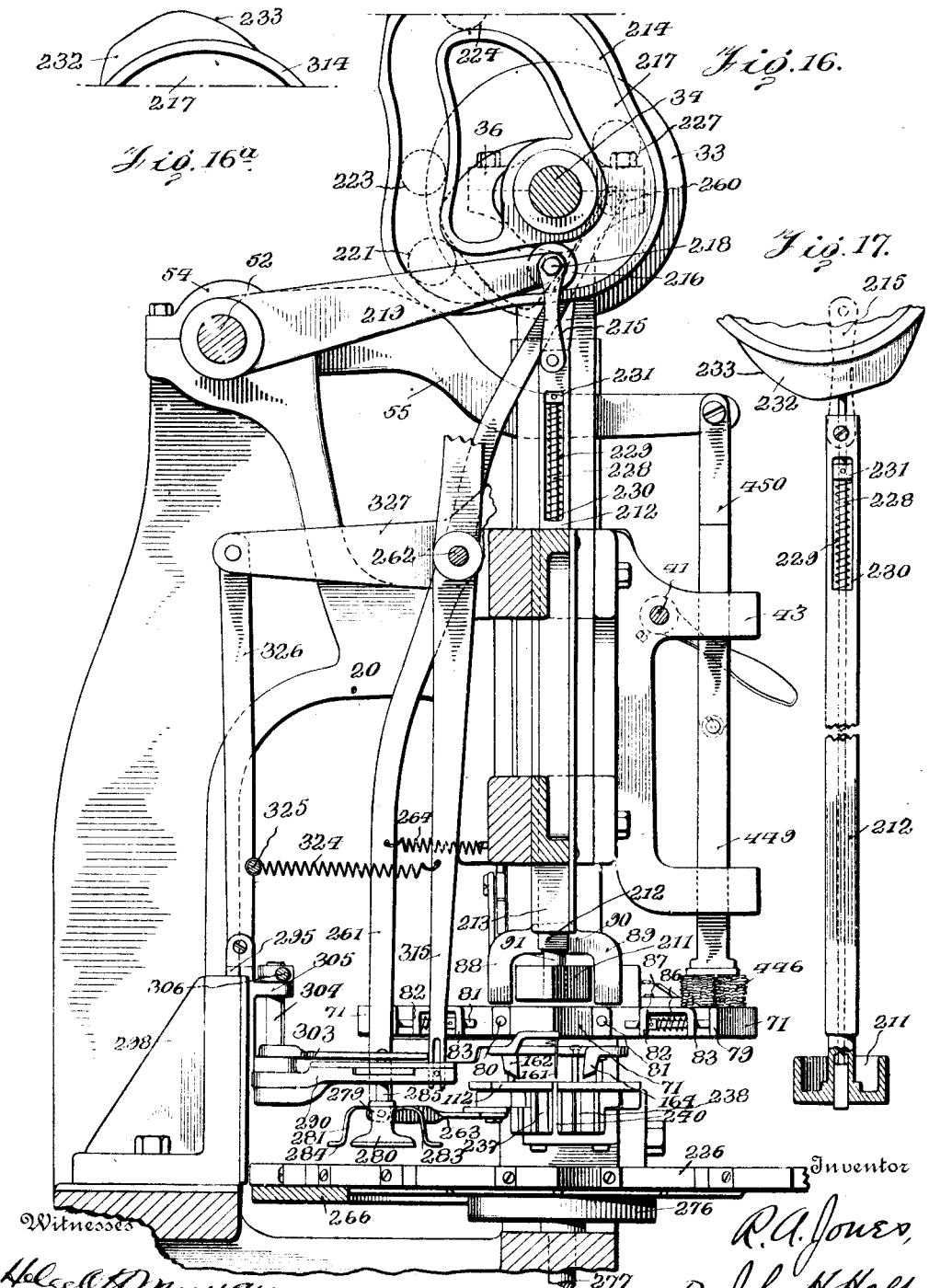

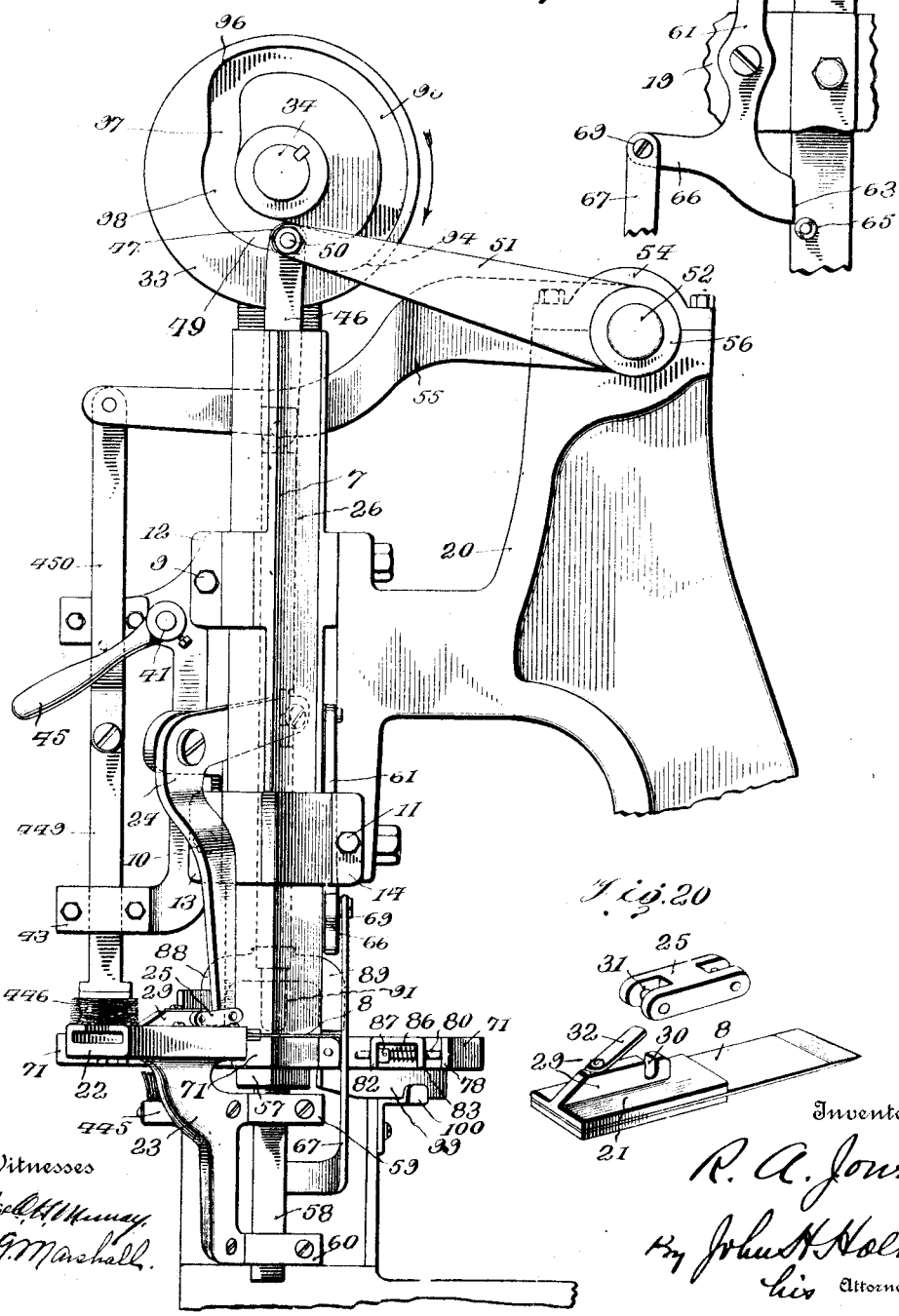

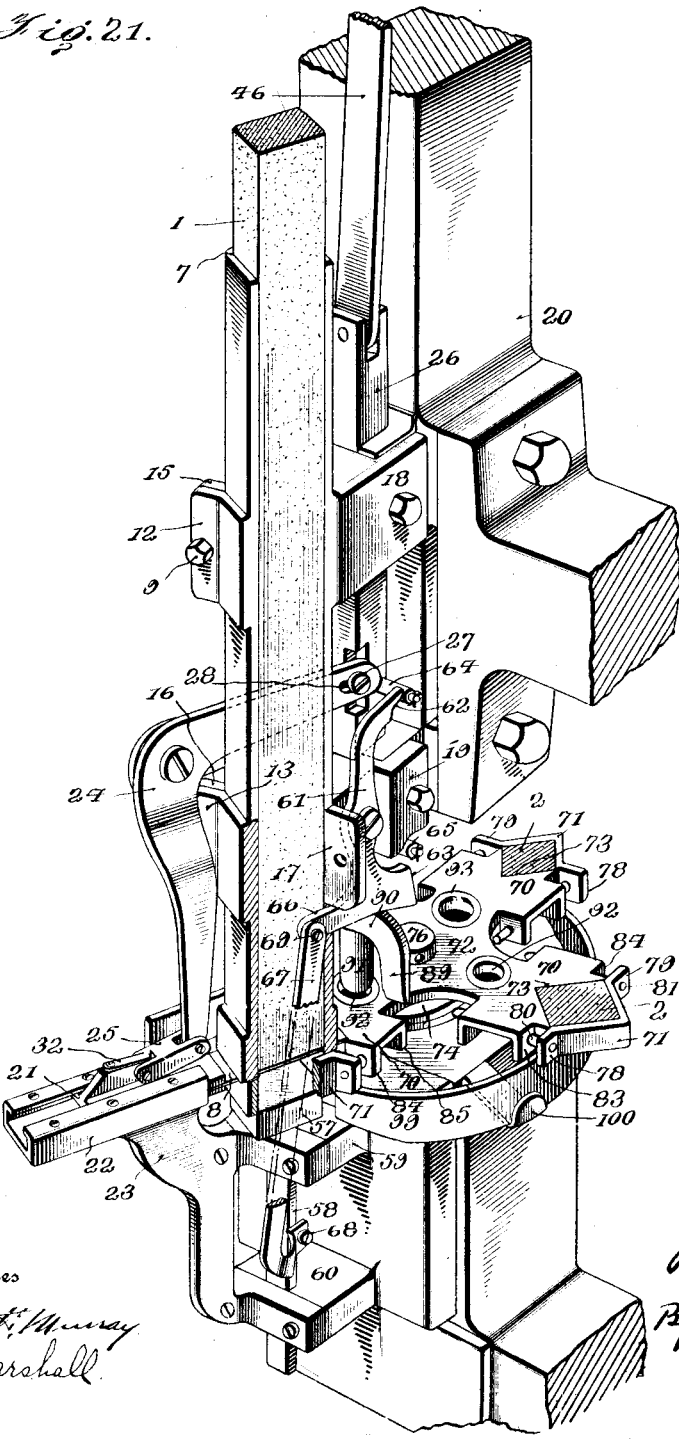

R. A. JONES.
WRAPPING AND LABELING MACHINE.
APPLICATION FILED FEB 27, 1911.
1,162,611.
Patented Nov. 30, 1915
19 SHEETS—SHEET 10.
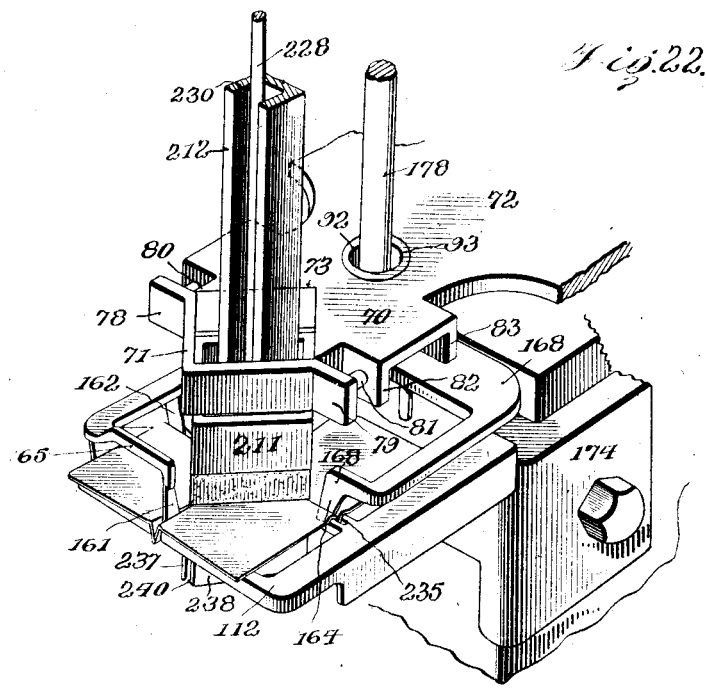
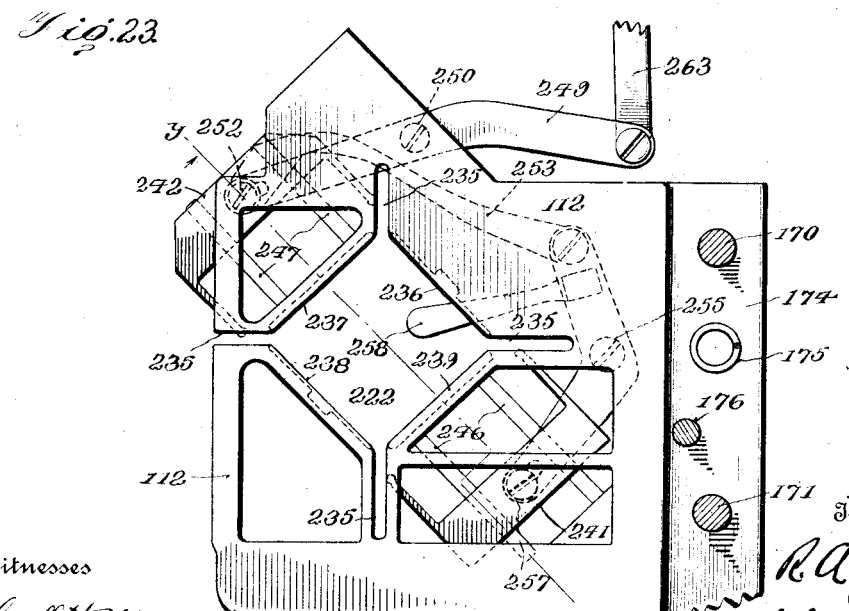

R. A. JONES.
WRAPPING AND LABELING MACHINE.
APPLICATION FILED FEB. 27, 1911.
1,162,611.
Patented Nov. 30, 1915.
19 SHEETS—SHEET 11.
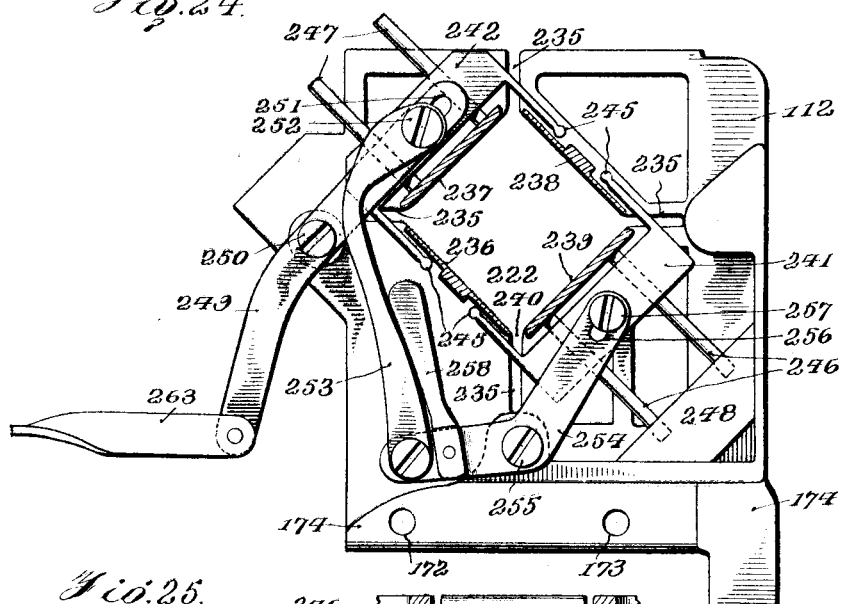
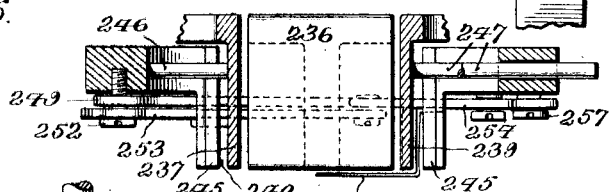
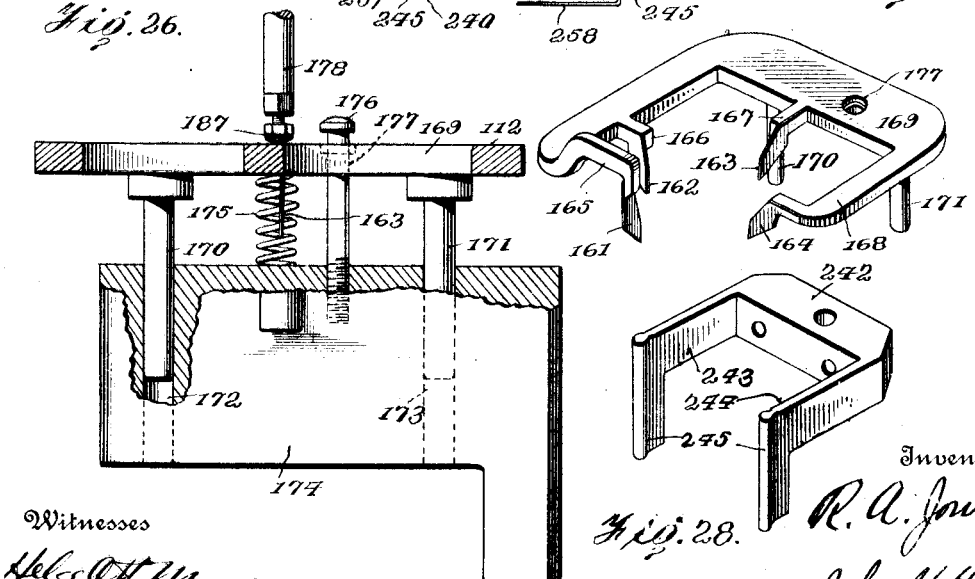
Witnesses
Inventor
R. A. Jones,
By John N. Holk
His Attorney

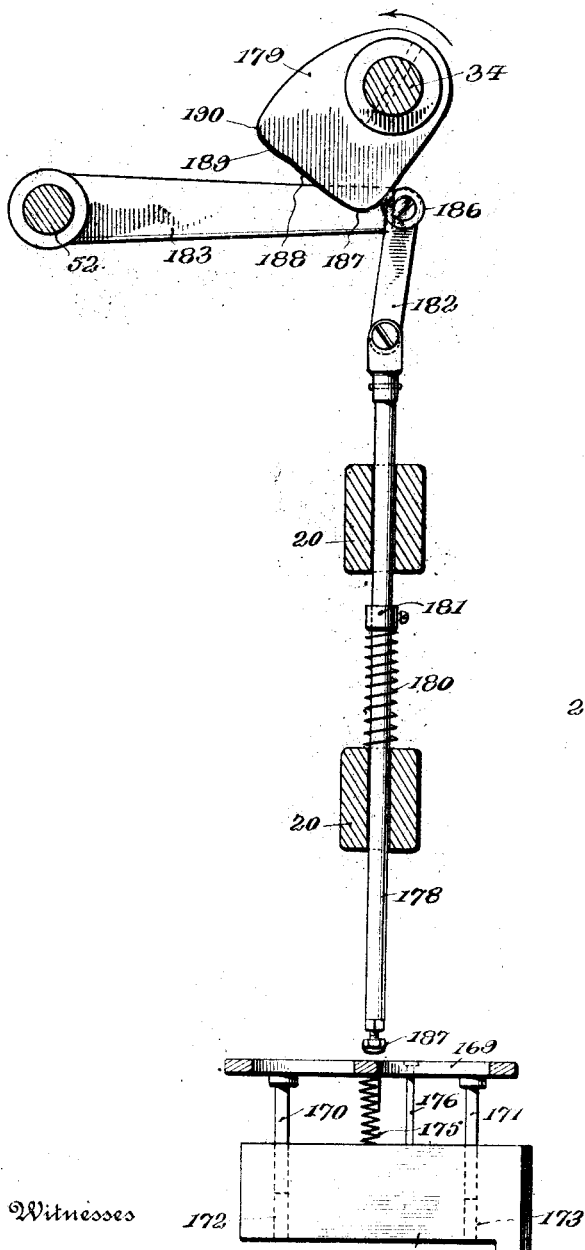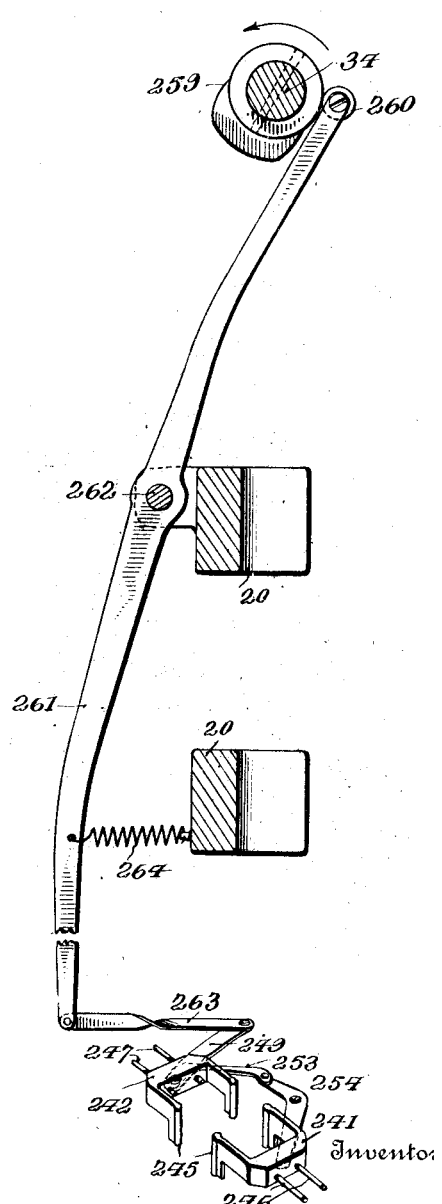

R. A. JONES.
WRAPPING AND LABELING MACHINE.
APPLICATION FILED FEB. 27, 1911.
1,162,611.
Patented Nov. 30, 1915.
19 SHEETS—SHEET 13.
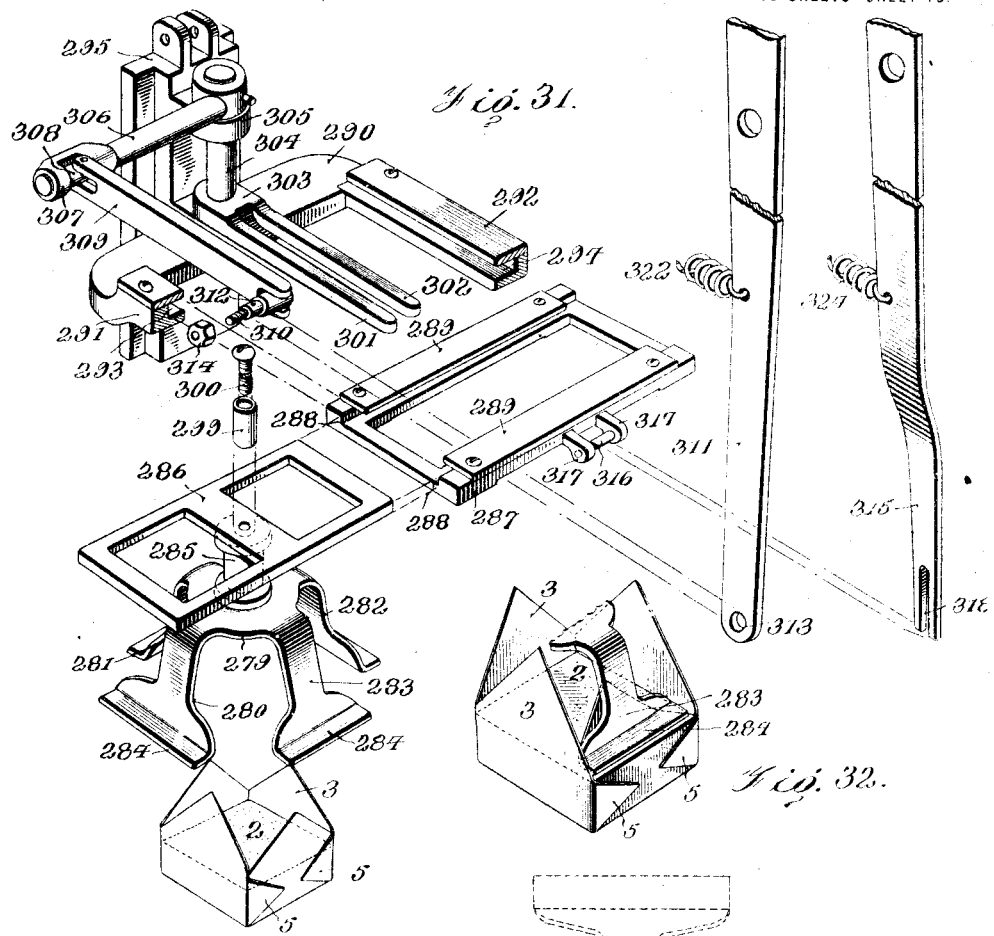
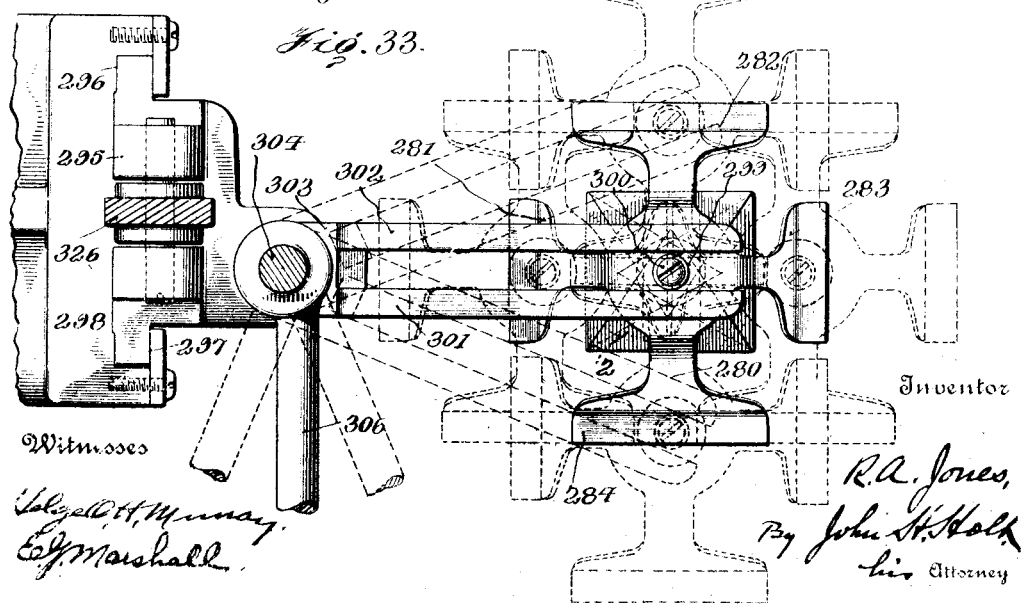

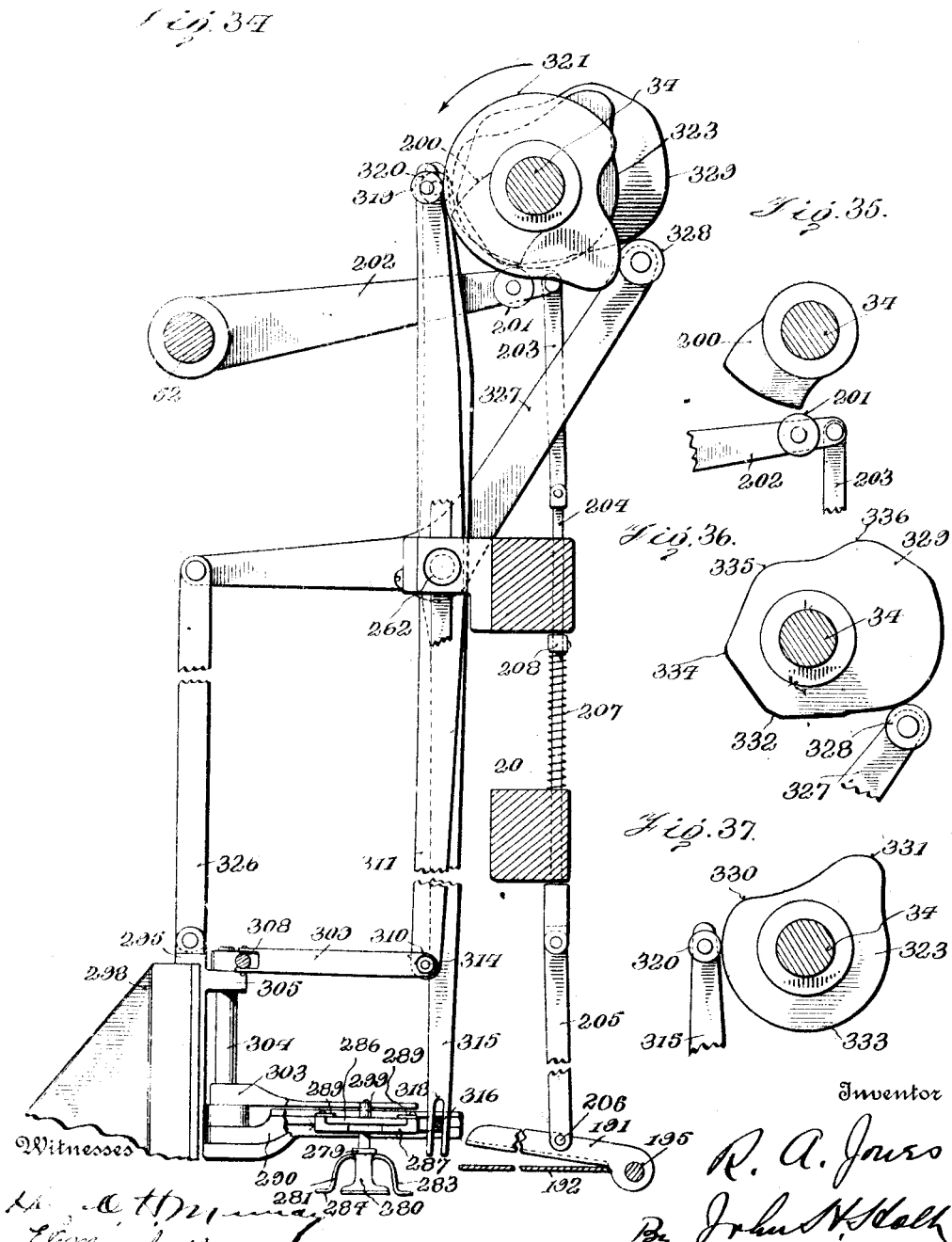

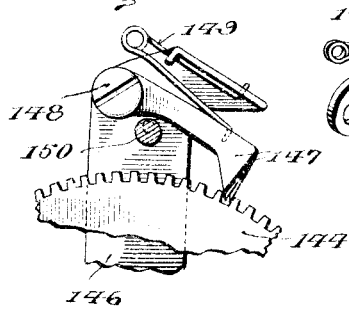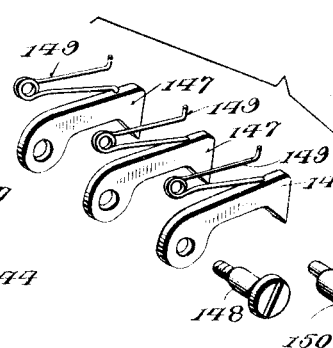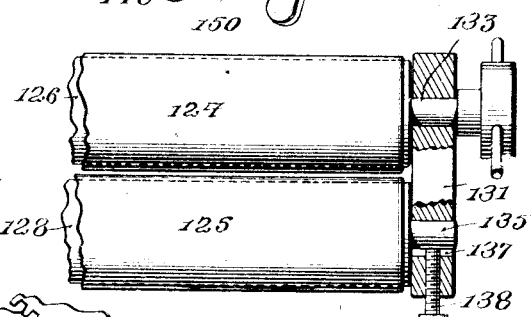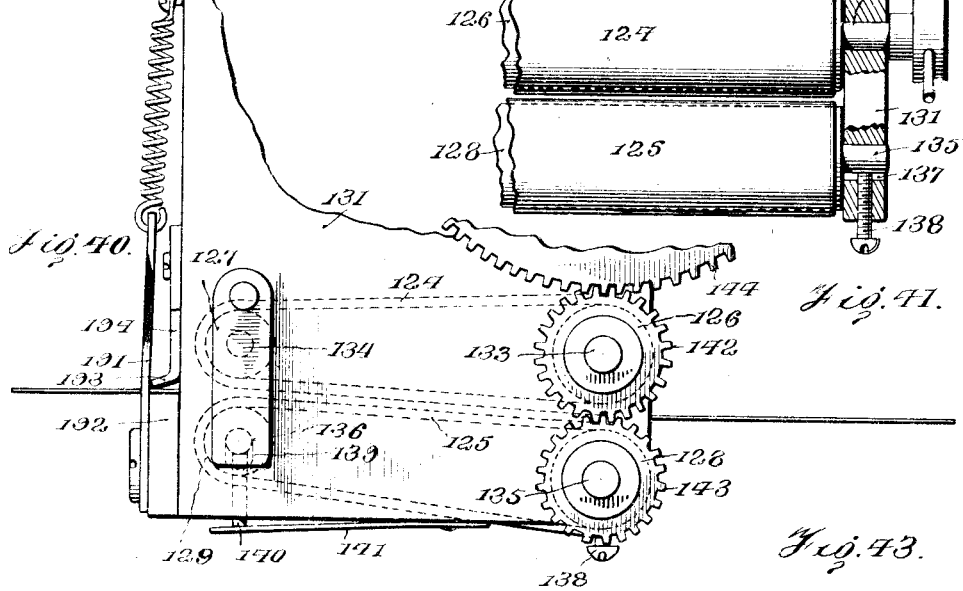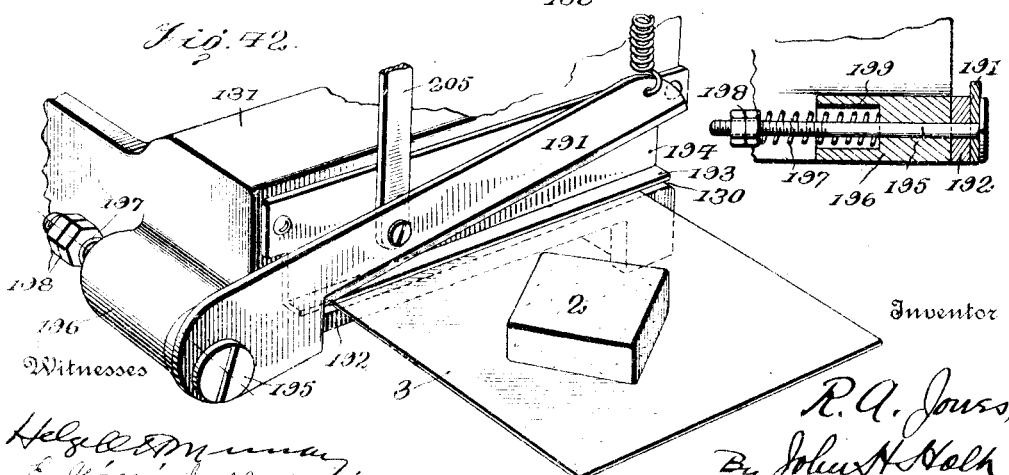

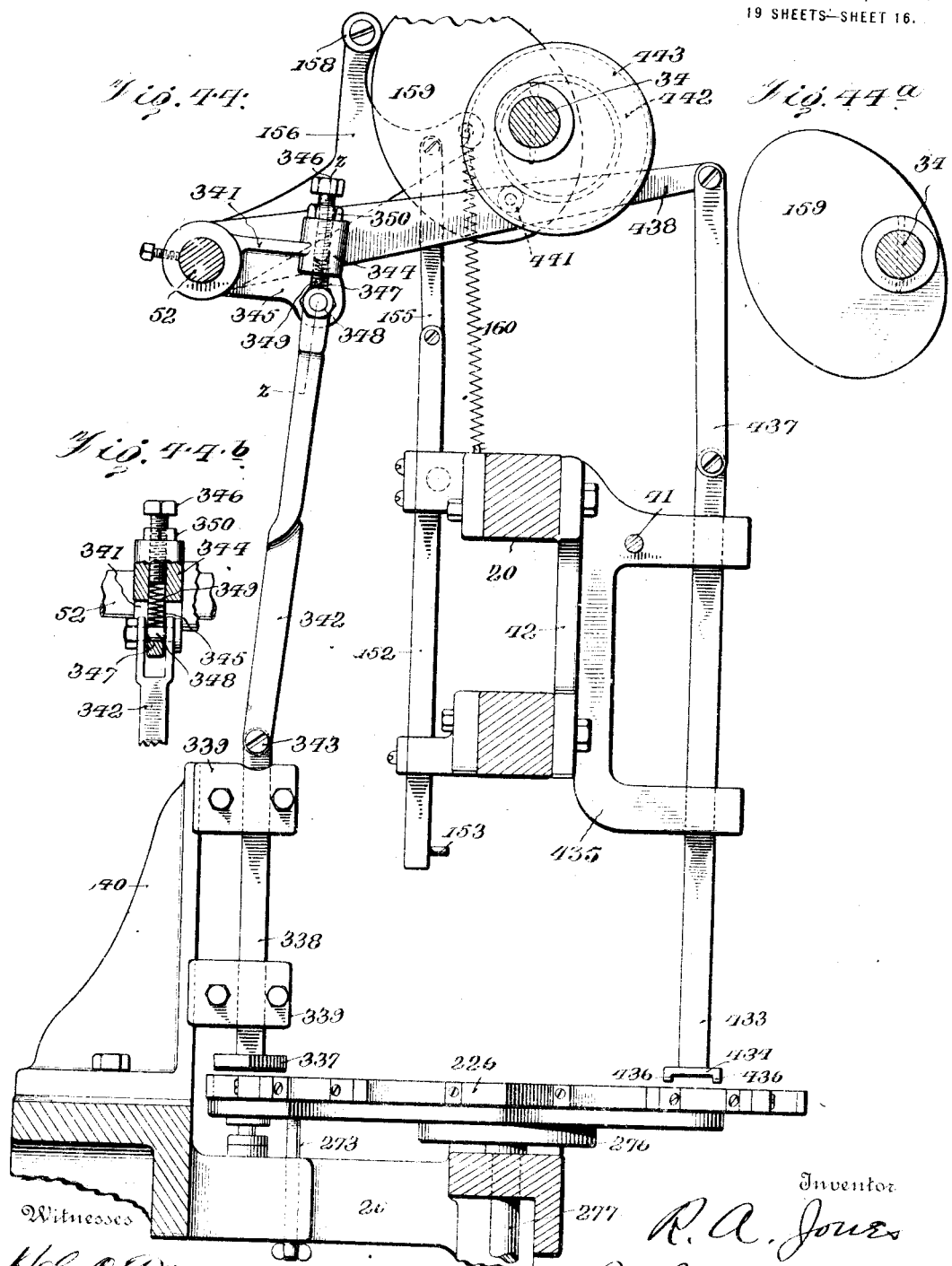

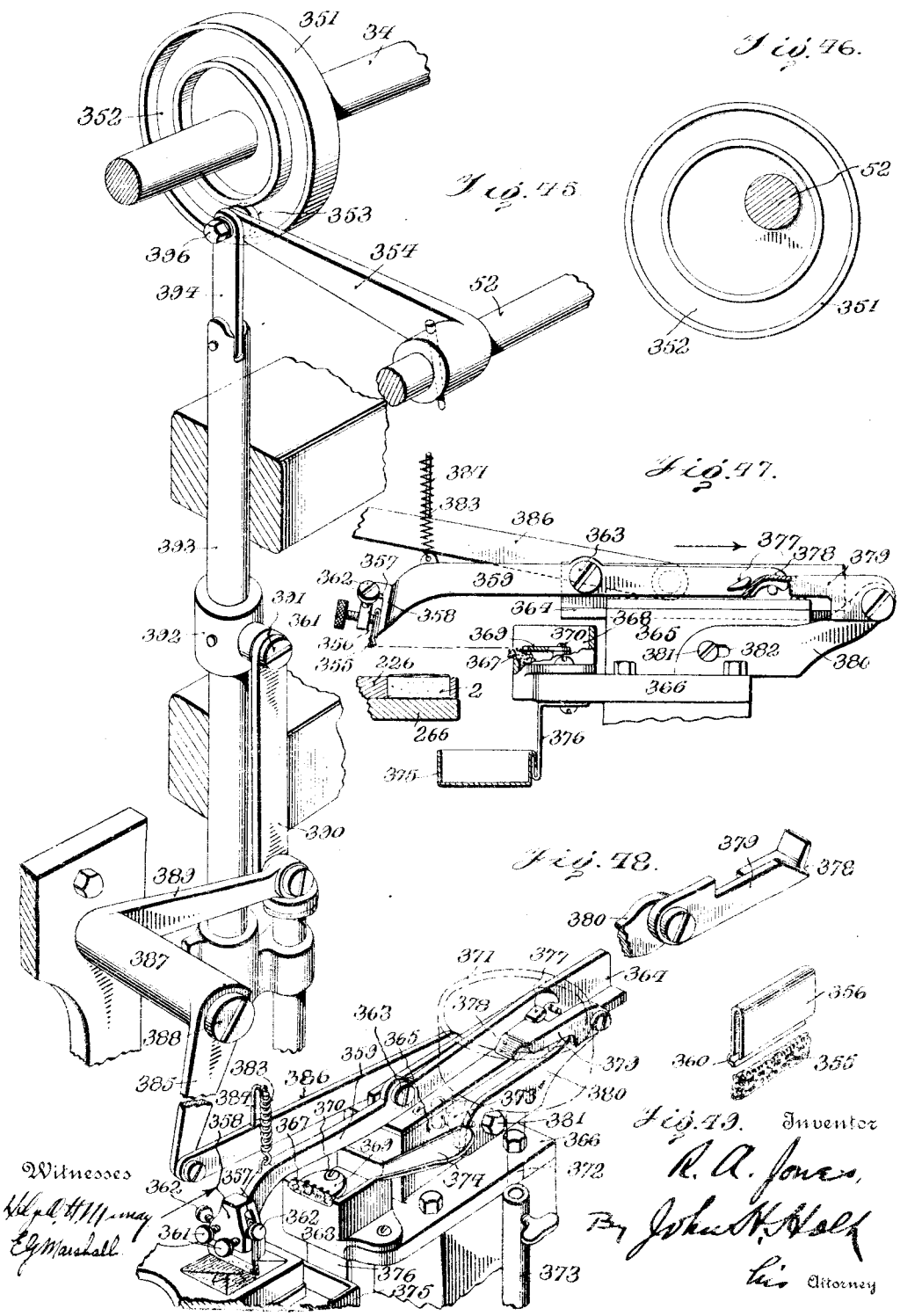

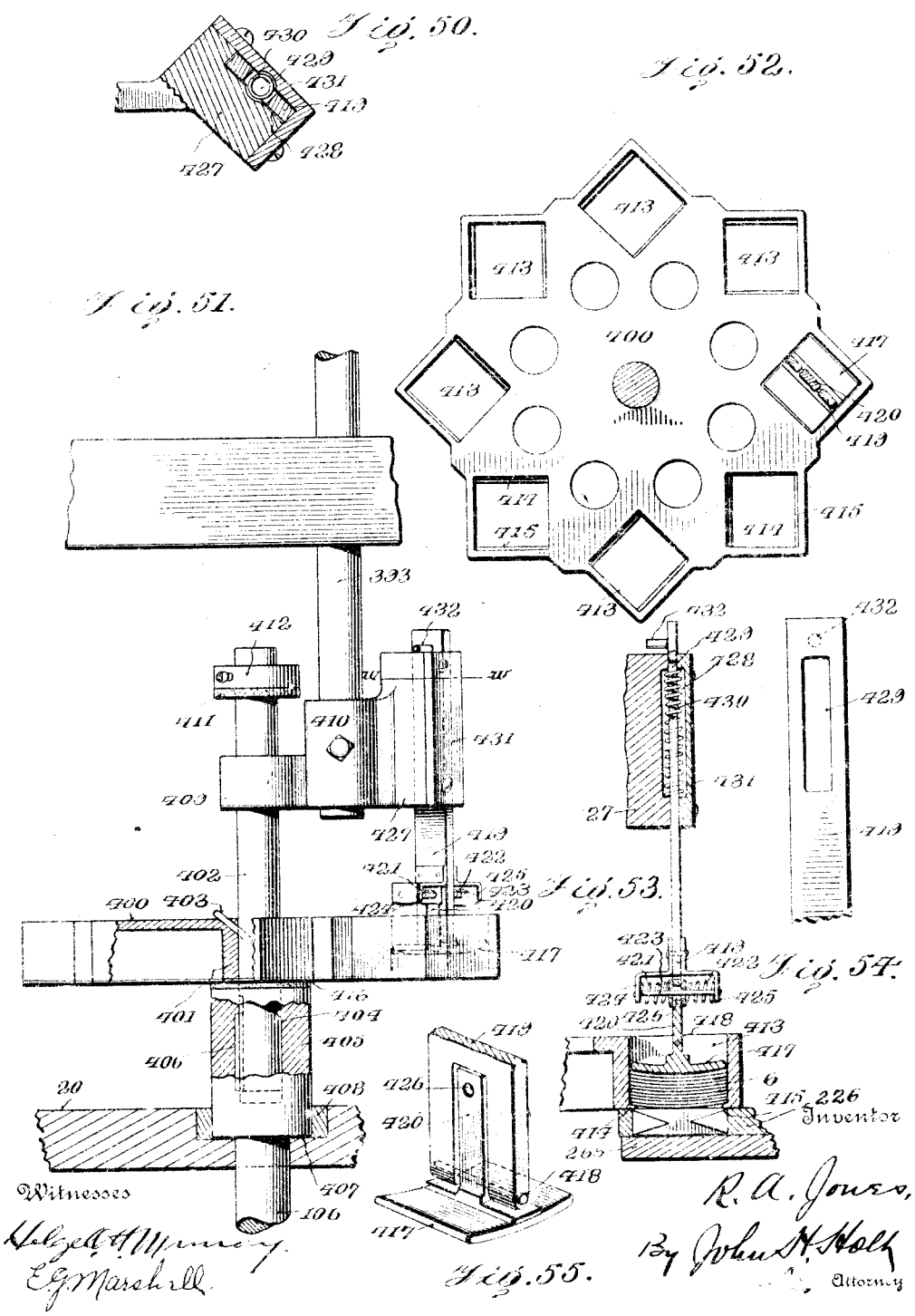

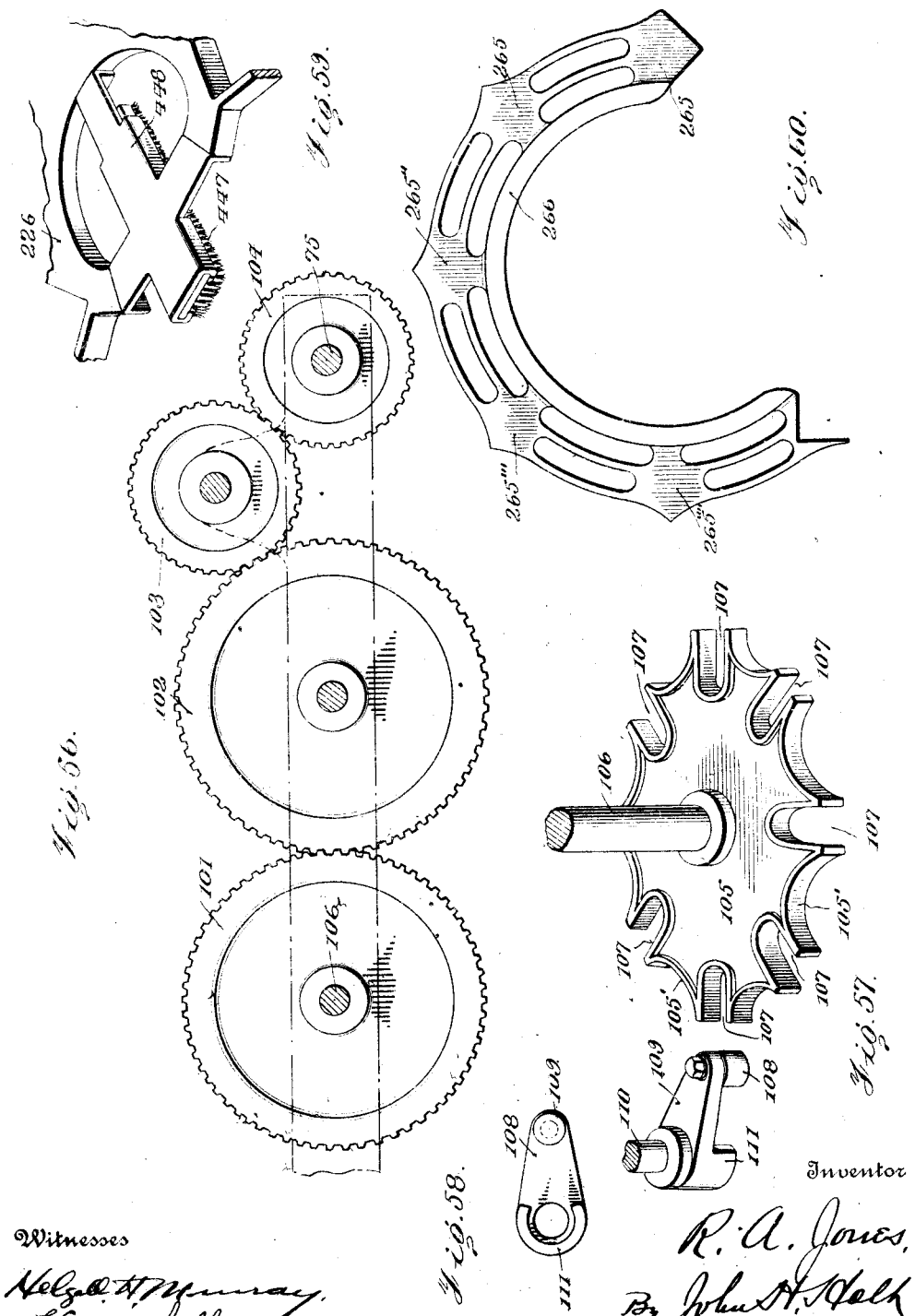

UNITED STATES PATENT OFFICE.

RUEL A. JONES, OF COVINGTON, KENTUCKY.

WRAPPING AND LABELING MACHINE.

1,162,611.

Specification of Letters Patent.  Patented Nov. 30, 1915.

Application filed February 27, 1911. Serial No. 611,218.

*To all whom it may concern:*

Be it known that I, RUEL A. JONES, a citizen of the United States, residing at Covington, in the county of Kenton and State of Kentucky, have invented certain new and useful Improvements in Wrapping and Labeling Machines, of which the following is a specification.

The primary object of this invention is the production of a practical machine which will cut sticks or bars of yeast, soap, candy or other material into cakes or tablets, automatically wrap these, and label them ready for distribution; the said machine comprising for this purpose a novel form of feeding and cutting mechanism, a novel form of wrapping and folding mechanism, a novel form of labeling mechanism, and a novel combination and arrangement of parts whereby these mechanisms are coöperatively combined in a single machine.

Figure 1:
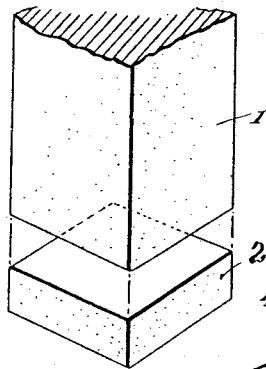
Figure 2:
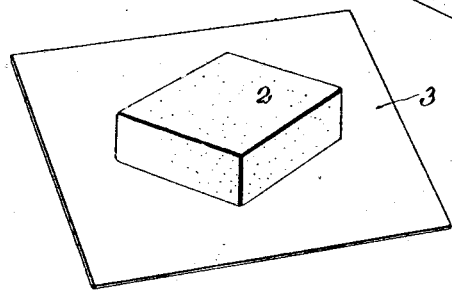
Figure 3:
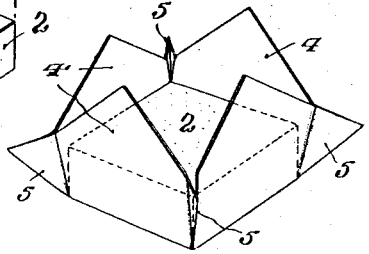
Figure 4:
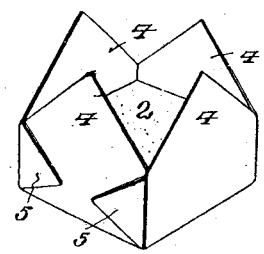
Figure 8:
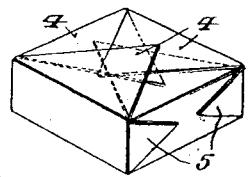
Figure 9:
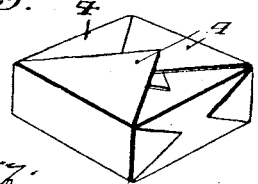
Figure 10:
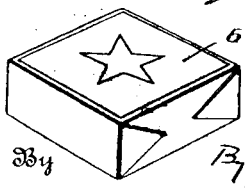
Figure 11:
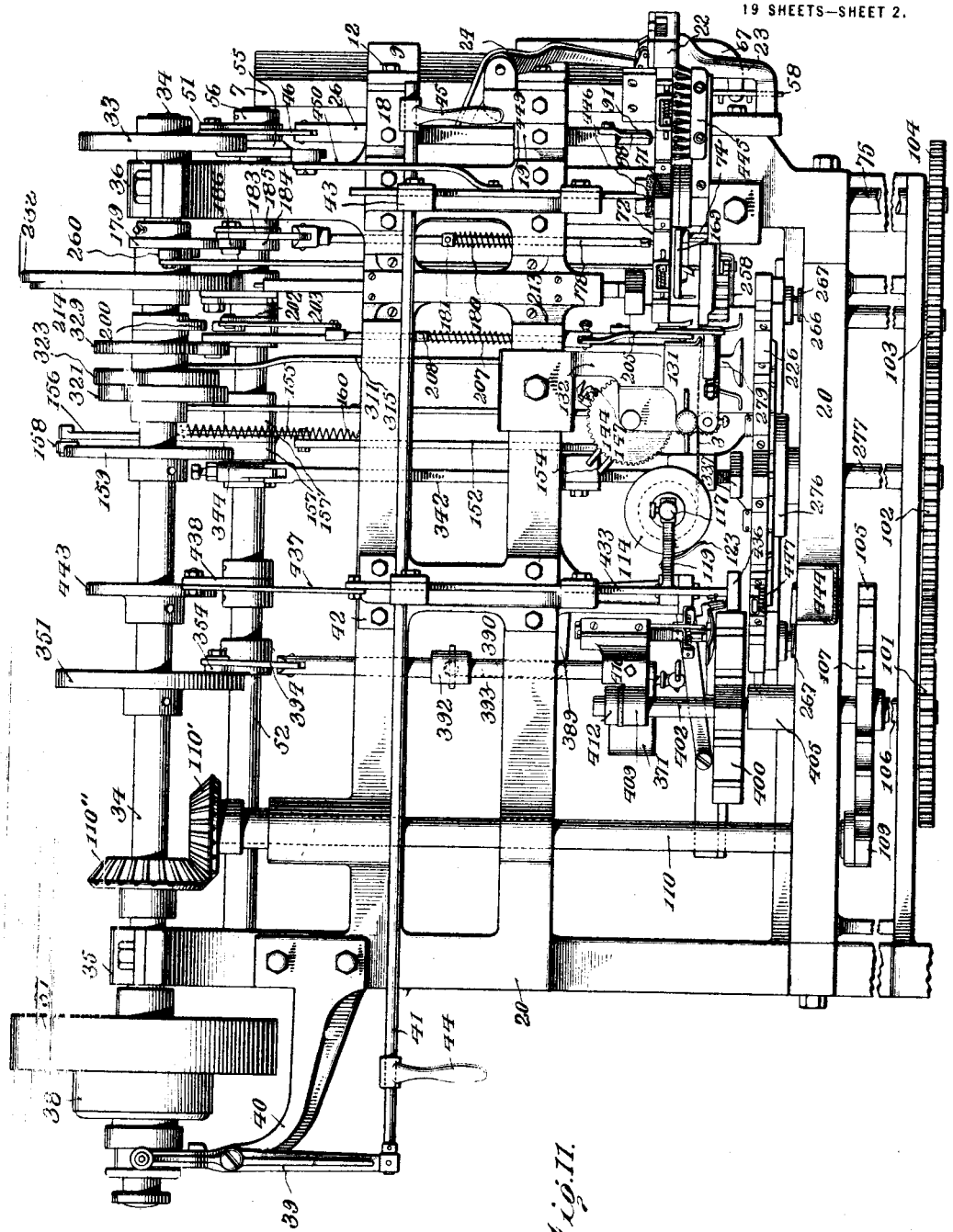
Figure 12:
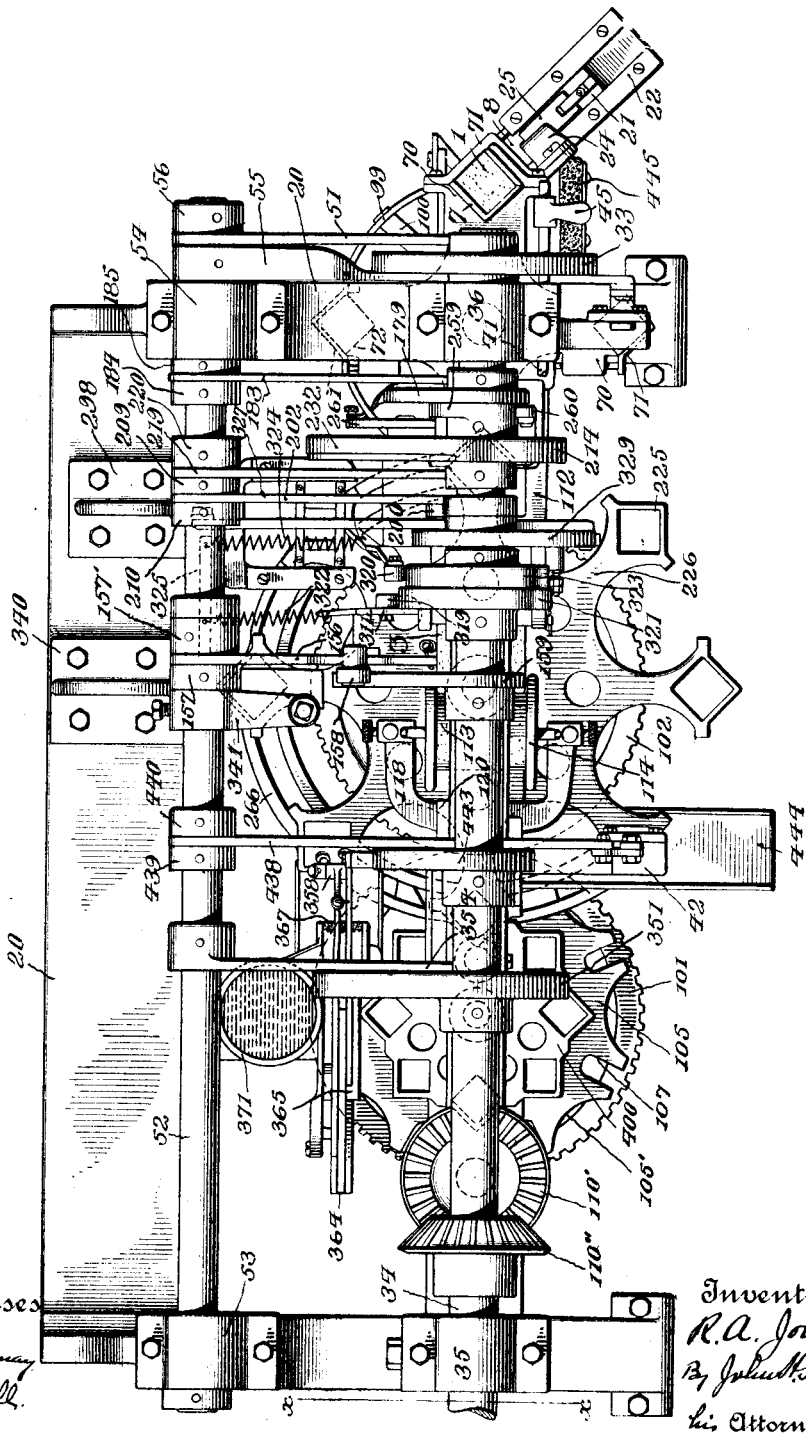
Figure 13:
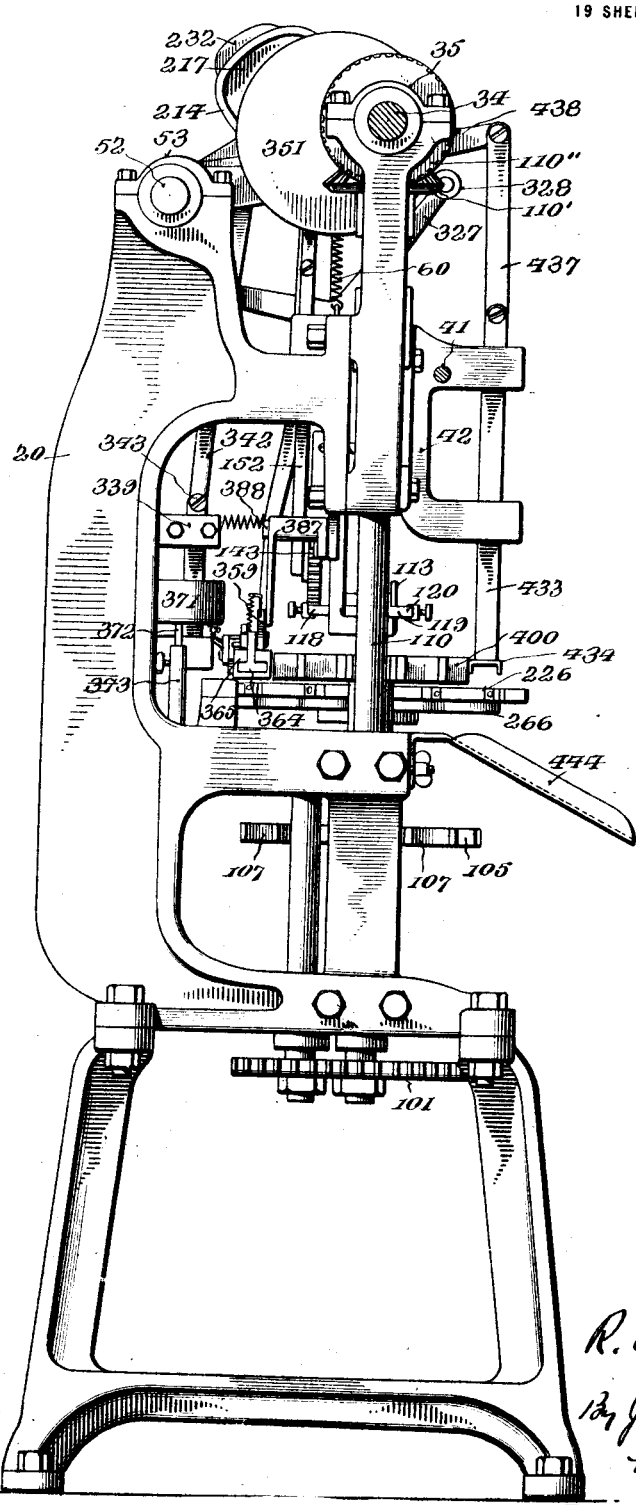

In order to more fully describe my said invention, reference will be had to the accompanying drawings, wherein, Figures 1 to 10, inclusive, illustrate diagrammatically successive operations performed by my said machine in the forming, wrapping and labeling of tablets; Fig. 11, represents in side elevation, with the legs of the frame omitted, one specific embodiment of my improved cutting, wrapping and labeling machine; Fig. 12, a top plan view of said machine with the driving clutch omitted; Fig. 13, a section taken on line *x—x* Fig. 12, looking at the end of the machine, many of the parts of the said machine located in the background being omitted for the sake of clearness; Fig. 14, a detail side elevation partly in section of a portion of the machine embracing parts of the tablet carrying, wrapping and wrapper feed mechanism; Fig. 15, a detail top plan view of said parts including a portion of the cutting mechanism; Fig. 16, a detail vertical section partly in elevation of parts of the tablet transferring and wrapping mechanisms and associated parts, showing the arrangement of levers and cams for operating these; Fig. 16ª, a side elevation of the portion of the cam cut away at the top of Fig. 16. Fig. 17, fragmentary detail view partly in section and partly in elevation of the plunger mechanism for transferring the tablets to the wrapping material and carrying them through the first wrapping operation; Fig. 18, an enlarged fragmentary detail front elevation of the tablet cutting and feed mechanism and associated parts; Fig. 19, a fragmentary detail side elevation of a portion of the lever mechanism employed when tablets are cut of a size smaller than the maximum; Fig. 20, a detail perspective view of the knife of the cutting mechanism, and the link and associated parts whereby this knife is connected to its operating mechanism; Fig. 21, a detail fragmentary perspective view of the tablet cutting and feeding mechanism; Fig. 22, a detail fragmentary perspective view of the mechanism for placing the tablets on the wrapper, holding the wrapper in position, and performing the first wrapping operation; Fig. 23, a detail top plan view of the supporting plate or frame upon which the wrapper is placed, and the sliding jaw mechanism for folding the corner flaps against the sides of the tablet as indicated in Fig. 4; Fig. 24, a bottom plan view of the parts shown in Fig. 23; Fig. 25, a fragmentary vertical section taken on line *y—y* Fig. 23; Fig. 26, a detail vertical section, partly in elevation, of the mechanism for engaging and holding the wrapper while being cut; Fig. 27, a detail perspective view of the movable plate with its four fingers which engage the wrapping material and crease and hold the same as referred to in connection with Fig. 22; Fig. 28, a detail perspective view of one of the sliding jaws for folding the corner flaps in toward the side of the tablet; Fig. 29, a detail view of the cam and lever mechanism for actuating the plate referred to above in connection with Fig. 27; Fig. 30, a detail view of the cam and lever mechanism for operating the mechanism for folding in the corner flaps of the wrapper, parts of the latter mechanism being shown in perspective; Fig. 31, a detail perspective view of the wrapping member for performing the steps indicated in Figs. 5, 6, 7 and 8, together with its supporting mechanism and levers for operating the same, the said parts being shown disconnected for the sake of clearness; Fig. 32, a detail perspective view, indicating one of the fingers of the wrapper member shown in Fig. 31, in the act of folding down one of the sides of the wrapper; Fig. 33, a detail top plan view partly in section to indicate the various operating positions of the wrapping member shown in Fig. 31; Fig. 34, a detail sectional view partly in elevation of the cam and lever mechanism for operating the wrapping member indicated in Fig. 31, and also the cam and lever mechanism for operating the knife for cutting the wrapping material; Fig. 35, a detail elevation of the knife operating cam and a portion of its lever; Fig. 36, a detail elevation of the cam and a portion of its lever for imparting vertical movement to the wrapping member shown in Fig. 31; Fig. 37, a detail elevation of the cams and a part of its lever for operating the folding device shown in Fig. 31; Figs. 38 to 43, inclusive, details of the mechanism for feeding and cutting the wrapping material; Fig. 44, an enlarged sectional elevation showing in detail the cam and lever mechanism for operating the device for pressing the wrapper flat upon the tablet, as indicated in Fig. 9, the cam and lever mechanism for operating the wrapper feed ing device, and the eccentric and lever mechanism for operating the ejecting device; Fig. 44ᵃ, a detail side elevation of the cam which operates the wrapper feed mechanism; Fig. 44ᵇ, a fragmentary detail section partly in elevation on line x—x Fig. 44; Figs. 45 to 49, inclusive, details of the mechanism for applying an adhesive substance to one face of the wrapper for securing the label thereto; Figs. 50 to 55, inclusive, details of the label applying mechanism; Fig. 50 being a section on line q—q Fig. 51; Fig. 56, a top plan view of the train of power gearing to which intermittent motion is imparted; Fig. 57, a detail perspective view of the intermittent drive for imparting rotation to the said train of gears; Fig. 58, a detail bottom plan view of the continuously rotating arm of the intermittent drive of Fig. 57; Fig. 59, a fragmentary detail perspective view of a portion of one of the tablet-carrying turn tables with its brush for sweeping the path traversed by the tablets, and, Fig. 60, a detail top plan view of a supporting plate over which the tablets are adapted to travel.

In the following description, I shall first point out in a general way what the machine herein shown will do, reference being had for this purpose to Figs. 1 to 10, inclusive, and afterward describe in detail the mechanism whereby these results are accomplished. In addition to other operations, which will be more fully pointed out later, this machine cuts a piece of previously formed material such as the bar or stick 1, into sections to form cakes or tablets, such as indicated by the reference numeral 2. It will then place each of these tablets in the order in which they are produced, on a separate piece of tinfoil or other wrapping material 3, and wrap each as follows: First, all the four corners 4, of the wrapper are simultaneously turned up into vertical planes as shown in Fig. 3, leaving four wings or ears 5, one at each corner of the tablet. It then turns all the ears 5, simultaneously inward so that they will lie flat against two opposite sides of the tablet as indicated in Fig. 4. It then turns the four upwardly extending corners 4, down one at a time over the top face of the tablet, in the order indicated by Figs. 5, 6, 7 and 8. After these corners are turned down as shown in Fig. 8, the entire wrapper covering the upper face of the tablet is pressed firmly down flat as indicated in Fig. 9. After this, the machine applies over the upper face of the wrapper a coating of mucilage, liquid glue or other sticky substance. It then applies to the face of the wrapper thus coated, a label 6, after which the wrapped and labeled tablet is ejected from the machine.

The wrapping material is intermittently fed from a roll into position to receive the successive tablets, and mechanism is provided which automatically shears or cuts off this material into proper lengths.

The machine does not finish one tablet before commencing on another, but quite a number of tablets are at the same time passing through the above wrapping and labeling process, so that great speed is obtainable.

The particular machine herein shown was devised especially to cut, wrap and label yeast, which is generally distributed by the trade in the form of small rectangular tablets wrapped in tin foil and bearing a paper label attached to the wrapper by some adhesive substance. It should be understood, however, as will hereinafter more readily appear, that I do not limit my invention to this particular use.

Taking up now the description of the machine in detail, reference will first be had to the tablet feeding and cutting mechanism, which is shown most clearly in Figs. 11 and 18 to 28. This mechanism comprises, among other parts, a vertical chute 7, in which the yeast or other material to be cut is placed, and a reciprocating knife blade 8 for cutting sections from this material to form the tablets. In the present description it is assumed that this material is fed to the machine in the form of bars or sticks 1, in which case they are placed in the chute 7, as shown most clearly in Fig. 21. This chute is rectangular in cross-section and is made in two longitudinal sections, each comprising two sides of the chute cast together, the said sections being held together to form the chute by means of bolts 9, 10 and 11 (Fig. 18) which pass through flanges 12, 13 and 14 and on one of said sections, and through flanges 15, 16, 17 (Fig. 21) on brackets 18 and 19 cast integral with the sides comprising the other section. This chute is supported by bolting the brackets 18 and 19 to one end of the machine frame 20, as shown. By means of this construction two sides of the chute may be readily removed and easy access had to the interior thereof for cleaning it or for other purposes.

One of the sides of the chute 7 is open from the top of the chute down to the bracket 19 (Fig. 21), allowing the bars of material to be placed in the chute from the side, thus permitting the lower end of a fresh bar to be placed on the upper end of an almost exhausted bar without having to lower the fresh bar through the top of the chute. This arrangement is advantageous where the bars are of such material as might separate if lowered through the top of the chute. I do not, however, limit my invention to any particular way of feeding the bars to the chute. This feeding may be done by hand or in any other suitable way.

In what we will call the initial position of the parts, the bar 1 rests upon the top of the knife blade 8, the upper face of which is adapted to lie flat up against the lower open end of the chute 7. This knife blade comprises a thin flat piece of steel tapering forward to a sharp cutting edge, and is made fast in a block 21, forming a crosshead mounted to slide in a guide block 22, carried by a bracket 23 bolted to the machine, as shown most clearly in Figs. 15, 18, 20 and 21. Reciprocating motion is imparted to this knife blade through the medium of a bell crank lever 24, one arm of which is connected through a link 25, to the crosshead 21, and the other arm to a rod 26, mounted for vertical reciprocating motion in the end of the machine frame, as shown most clearly in Fig. 21. The last mentioned arm of the bell crank lever is connected to the bar 26, by means of a screw and slot connection 27—28.

For the purpose of enabling the knife blade to be readily and quickly removed and replaced, a connection between the link 25 and the crosshead 21, is provided which does not necessitate the loosening of any screw in order to disconnect it from the said crosshead to permit the knife blade to be withdrawn from the guide block 22. This connection is effected by providing the vertical flange or rib 29, on the back of the crosshead (see Fig. 20) with a vertical slot 30, in which is adapted to rest pin 31, of the link 25, the said pin being prevented from riding out of the top of the slot by means of a retaining spring 32. This spring is pivotally secured to the top of the rib 29, so that when it is desired to withdraw the knife block from the link 25, all that is required is to turn the spring 32 to one side as shown in Fig. 20, and lift the link pin 31, from connection with the slot 30.

The bar 26, receives its reciprocating motion from a grooved cam 33, mounted fast on the shaft 34, journaled in bearings 35 and 36, on opposite ends of the machine frame. This shaft constitutes the main power shaft of the machine and receives its motion from power applied to the pulley 37 of a friction clutch 38, which may be of any suitable construction. This clutch is provided with the usual lever 39, for coupling and uncoupling the fast and loose members of the clutch, and this lever is pivoted on a bracket 40, secured to the machine frame as shown. This lever may be operated from either end of the machine by means of a rod 41, connected thereto and supported to slide in brackets 42 and 43, on the machine frame. This rod is provided with handles 44 and 45, for shifting the same laterally for operating the clutch. The machine may be brought instantly to rest by throwing the rod to the right, and may be started up again by throwing the said rod to the left.

Motion is imparted from the cam 33, to the bar 26 through link 46 pivotally connected at one end to the upper end of bar 26, and carrying at its other end a roller 47 which travels in the groove 49 of cam 33 (Fig. 18). This roller is supported on a stud bolt 50 which forms a pivotal connection between the connecting rod 46 and an arm 51. This arm 51 is loosely mounted on a shaft 52 journaled in bearings 53 and 54, on opposite ends of the machine frame, the said arm 51 being held against lateral motion between an arm 55, hereinafter described, and a collar 56 fast on shaft 52.

In its back travel, the knife blade 8, is withdrawn from the bar 1, so that the latter drops by its own weight until its lower end rests upon a supporting block 57, then the knife travels forward again and severs the bar, leaving below the lower end of the chute a tablet the thickness of which will depend upon the distance the upper face of the block 57 is from the bottom of the chute at the time the cutting takes place. (Figs. 18 and 21). This block 57 is carried on one end of a bar 58, mounted to slide vertically in bearings formed by lugs 59 and 60 on the machine frame, and the bracket 23. In cutting tablets of maximum thickness the bottom of the block 57 rests down upon the top of lug 59. Means are provided, however, whereby this block may be raised at proper intervals to support the bar 1 in a more elevated position during the cutting process than is done when cutting tablets of maximum thickness. In this way the machine may be adjusted for cutting tablets of more than one thickness, and in order to bring in the operation of all parts of the machine in cutting, wrapping and labeling tablets, it is assumed in the present description that the machine is adjusted for cutting tablets of less than the maximum thickness, and in the diagrams Figs. 1 to 10 the tablet is shown accordingly.

The mechanism for raising the block 57, when the machine is employed to cut tablets of less than maximum thickness, is shown most clearly in Figs. 18, 19 and 21, and consists, among other parts, of a bell crank trip lever 61 pivoted on the stationary bracket 19 and having arms with cam portions 62 and 63, respectively, which are adapted to be engaged at times by rollers 64 and 65, mounted on the reciprocating rod 26. An arm 66 of this trip lever is pivotally connected through a connecting rod or link 67 to the bar 58 which carries the supporting block 57. In its downward travel, the rod 26 brings roller 65 into engagement with cam face 63 of the trip lever, thus turning said lever on its fulcrum so as to elevate its arm 66. Upward movement is thereby transmitted to link 67 and therethrough to bar 58 and block 57, causing said block to pass upward into its proper position to receive the bar of material 1 when it drops. The relative positions of the lever 61 and rollers 64 and 65 when the rod 26 reaches the limit of its downward travel are shown in Fig. 19. In its upward travel, the bar 26 carries the roller 65 out of engagement with cam 63, and just before the rod 26 reaches the upper limit of its travel, roller 64 engages cam 62 of the lever 61 turning said lever on its pivot so as to send arm 66, link 67 and bar 58 downward. This removes the block 57 from the path of a rotary carrier, described later, which by that time holds the tablet. These operations are repeated as the reciprocating rod 26 continues its motion. It will be seen that by substituting a shorter or longer link for the link 67, the thickness of the tablet, less than the maximum, may be varied, since the distance of the travel of block 57 upward determines the thickness of the tablet, and this in turn may be varied by varying the length of said connecting links. If it is desired to operate the machine for tablets of maximum thickness, the mechanism just described for operating the block 57 may be easily uncoupled or rendered inoperative by removing pivot screw 68 or 69 or both, and thereby disconnecting the link 67. Obviously, if desired this mechanism for lifting the block 57 may be omitted altogether.

When the bar 1, drops down from the knife blade on to the block 57, its lower end is gripped between two jaws 70 and 71, (see Fig. 21) which open to receive said bar as it passes downward, and close in on and hold it firmly against lateral movement by the knife blade in cutting through it. These jaws are opened and closed one set at a time intermittently to receive the lower end of the bar. The jaws 70 are formed on the ends of four rotating arms of a plate 72, and each of said jaws is provided with an angular cut away portion or right angle notch 73 to receive the tablet. 70 The plate 72 is mounted fast upon a disk 74, formed on the upper end of rotatable shaft 75. The said plate is held down flat upon the said disk by means of a screw stud 76 which passes through an opening in the center of said plate into the upper end of said shaft (Fig. 14). The said shaft and plate are held against relative movement by means of a bolt 77. The jaws 71 consist each of an angular plate having wings or flanges 78, and 79 made fast respectively to pins 80 and 81, mounted to slide in pairs of lugs 82—83 and 84—85 on the jaws 70. The jaws 71 are normally held closed against jaws 70 under compression of springs 86 mounted on pins 80 and 81 between one of the supporting lugs of the pins and a collar 87, fast on each of said pins 80—81. These jaws are opened at the proper intervals to receive the end of the stick 1, by the engagement of the beveled lower ends of two downwardly extending fingers 88 and 89, engaging the rear ends of the two pins 80 and 81, respectively, of that pair of jaws which happen to be in position to receive the material to be cut. The pins 80—81 are rounded at their rear ends where they are engaged by the beveled portions of the fingers 88—89. These fingers are formed on a yoke 90 made fast to the bar 26, near its lower end, and, therefore, as said bar reciprocates up and down, a similar motion will be imparted to the fingers 88-89.

It is very important that the plate 72, in its intermittent rotary motion, come to rest each time in exactly the proper position, and in order to guard against any possible accidental angular displacement from this proper position, the rod 26, forms at its lower end a cylindrical plunger 91, which, each time said bar travels downward, passes with a close fit into an opening 92, in one of the arms of the plate 72. There is one such opening 92 in each of said arms, and each opening is provided with a hardening steel bushing 93, to reduce wear. The lower end of the plunger 91 is preferably rounded at its edges.

The timing of the opening of the jaws 71, with respect to the movement of the knife blade may be best understood from Figs. 18 and 21 taken together. In Fig. 18, the cam 33 is shown in a position in which the rod 26 is just about to descend. As the cam 33, continues its rotation in the direction of the arrow, Fig. 18, from its position shown, to a point where the roller 47 reaches the turn 94, in the cam groove, the rod 26 will be forced quickly down, sending beveled fin gers 88 and 89, against the pins 80—81 of the jaws 70—71, the plunger 91 passing into one of the openings 92 in the plate beneath it. This downward movement of the rod 26, also operates bell crank lever 24, causing the knife blade 8 to be withdrawn from the bottom of the chute. This blade, however, does not pass entirely from under the bars 1 before the jaw 71 under the chute opens. Then there follows quite a pause in the movement of the knife and the jaw actuating fingers 88 and 89, this taking place while the roller 47 is traversing the extended concentric portion 95 of the cam groove. When, however, the turn 96 in said cam groove is reached by the roller 47, and the latter passes into the radial portion 97 of said groove, the rod 26, is drawn quickly up. The result is that the jaw pins 80—81 are released and the movable jaw 71 now in position to receive the end of the stick closes in on and grips it firmly. Instantly that this happens the knife blade commences to cut through the bar of material 1, and is forced rapidly therethrough as the rod 26, continues its upward movement. When the knife has been sent to the limit of its forward travel, there is another pause of the rod 26, occasioned by the passage of roller 47, into the concentric portion 98 of the cam groove. During this pause another pair of jaws 70—71 are brought into position beneath the chute to receive the lower end of the bar 1, and the tablet cut off by the operation just described is carried around to a position 90° from the cutting position. In a similar manner another tablet is formed and transported away from the cutting position, and so on for each succeeding tablet. In being thus transported the tablet travels over the upper edge of a circular support 99, made fast to brackets 100, secured to the frame of the machine. (See Fig. 15 in addition to Figs. 18 and 21).

The plate 72 with its jaws 70—71 comprises a rotary turn table or carrier which transports the tablets from the cutting position and places them in the proper position to undergo the first wrapping operation. This turn table, therefore, performs the threefold function of holding device to assist in the cutting operation, a carrier, and positioning means adapted to place the tablet in the proper position relative to the wrapping material as later described.

The shaft 75, on which the turn table plate 72 is mounted, and from which said turn table receives step-by-step rotary motion, receives its motion through a train of gears 101, 102, 103 and 104, connected to mechanism for producing intermittent rotation. This latter mechanism is shown most clearly in Figs. 11, 57 and 58, and comprises, among other parts, a disk 105, mounted fast on an upright shaft 106 journaled in the machine frame and carrying gear 101 which is also fast thereon. This disk 105 is provided with a series of radial slots or openings 107, the centers of which are located 45° apart. These slots 107 are adapted to be engaged at regular intervals by a roller 108, mounted on the end of an arm 109 fast on the end of an upright shaft 110, geared to the main power shaft 34 through beveled gears 110′, 110″. The arm 109 rotates constantly as long as the shaft 34 rotates, and once in each revolution its roller 108 engages a radial slot 107, in the disk 105, and steps the disk around 45°. The arm 109 is provided with a circular flanged portion 111 which, when the roller 108 passes from engagement with the disk 105, engages inwardly curved portions 105′ of said disk, thereby holding the latter against rotation except when this is caused by the roller 108. This arrangement for securing intermittent motion, however, is an old and well known mechanical movement.

The gearing between shafts 75 and 106, as will be seen from Fig. 16, is so proportioned that an eighth of a revolution of the shaft 106 will impart a quarter of a revolution to the shaft 75.

We now assume that the turn table 72 has carried the tablet first cut to a position 180° from the cutting position, where it pauses until the roller 108 (Fig. 57) now just leaving one of the radial slots in disk 105, rotates around to engage the next of said slots; in other words, about three quarters of a revolution of shaft 110. During this pause the tablet 2 is in the position shown in Fig. 14, ready to be ejected from the turn table 72. By the time the tablet has reached this position, a piece of wrapping material 3 has been fed into position to receive it when so ejected, the said wrapping material resting on the flat upper face of a frame 112 hereinafter more particularly described. This brings us to the first wrapping operation; but before taking up that operation, the mechanism whereby the wrapping material is fed at the proper time into position and cut into proper lengths will first be described. (See Figs. 14, 15, 34, and 38 to 43, inclusive.)

The tin foil or other wrapping material, in the machine shown, is carried in a roll 113 on a reel 114 supported by a shaft 115, mounted at each end for rotation between two milled screws 116 and 117, carried by arms 118 and 119 (Fig. 15) of a bracket 120, bolted to the frame of the machine as shown. The screws 116—117 are locked in the proper position by means of milled screws 121—122. This arrangement permits the exhausted reels to be removed and fresh ends readily supplied. The screws 116—117 furthermore provide for the proper alining adjustment of the reel with respect to certain feed mechanism later described. The rotation of the reel is preferably retarded by means of a brake in the form of a spring 125 secured at one end to the bracket 126, and resting at its other end against the periphery of the reel. The wrapping material passes from this reel in the form of a strip or band, to a conveyer comprising two endless belts 124 and 125, carried respectively by rollers 126, 127, and 128, 129, the said wrapping material passing first between rollers 126 and 128, and thence between rollers 127 and 129, through a slot 130 formed at the end of a frame 131, forming a portion of a bracket 132 bolted to the machine frame as shown. The rollers 126, 127, 128 and 129 are carried on shafts 133, 134, 135 and 136, respectively journaled in the sides of said frame. The bearings of shafts 133 and 134 are not intended to permit of any vertical movement of said shafts, but the shaft of each of the lower rollers 128 and 129, has a limited amount of vertical play for adjusting the pressure of the rollers on the wrapping material. For this purpose the openings 137 (Fig. 41) into which the ends of the shaft 135 pass are slightly elongated vertically and the shaft rests upon the upper ends of screws 138 by which the vertical position of said shaft may be adjusted. The openings 139 into which the ends of the shaft 136 extend are also slightly elongated vertically, and the ends of this shaft rest upon pins 140, vertically slidable in the frame 131, and resting at their lower ends upon spring plates 141 made fast to the said frame as shown. In this way the roller is yieldingly supported so that it will adjust itself automatically to the material to be fed.

The shafts 133 and 135 are geared together by intermeshing pinions 142 and 143 carried on said shafts and driven by a gear 144 intermeshing with pinion 142. Gear 144 is mounted loosely on a stud shaft 145 journaled to rotate in the bracket 132. This gear 144 receives intermittent rotary motion from a rocking bell crank lever 146 to which it is pivotally connected at intervals by a series of pawls 147. This lever 146 is mounted fast on the stud 145 alongside the gear 144, and the pawls 147 are mounted loosely on a stud 148 screwed into one arm of said lever as shown, the said pawls being held against the teeth of gear 144 by springs 149. The pawls 147 are staggered as shown so as to insure positive action and they may be thrown and held out of engagement with the gear 144 by means of a cam 150 mounted on the arm of the lever 146 directly beneath the pawls 147 as shown. By simply rotating this cam, by turning the thumb piece 151, carried thereby, all of the pawls 147 may be lifted from the teeth of the gear 144 or lowered into engagement therewith, as desired. By this arrangement the feeding of the wrapping material may be stopped without stopping the machine. (Figs. 38 and 39).

The lever 146 receives rocking motion from a vertically reciprocating rod 152, the lower end of which is connected to said lever by a pin 153 on said rod engaging an elongated slot 154 in one arm of said lever. The upper end of rod 152 (see Fig. 41) is flexibly connected through a link 155 to an arm 156 fulcrumed loosely on shaft 32 and held from lateral movement thereon by collars 157 and 157' fast on said shaft (see Fig. 42). This arm carries a roller 158 which engages the periphery of a cam 159 mounted fast on the main cam shaft 34, the roller being held in engagement with said cam by spring 160. The cam 159 is so shaped and adjusted on its shaft 34 as to properly time the operation of the above described wrapper feeding mechanism which takes place directly after the preceding tablet with its wrapper has been removed from the top of the frame 112. At the commencement of its travel, the wrapping material is fed forward comparatively slowly for a short distance to allow certain mechanism hereinafter described and employed in wrapping the preceding tablet, to get out of its path, after which the wrapper is fed forward rapidly. From Fig. 41 it will be seen that quite a pause takes place in the movement of arm 156 as the roller 158 is passing over the portion of the cam 159 lying close to shaft 34. It is during this pause that the preceding tablet and its wrapper are gotten out of the way of the fresh wrapper.

The operation of the wrapper feed is as follows: When the cam 159 (see Fig. 41) has rotated to that position where the roller 158 is nearest the shaft 34, the rod 152 will have reached the lower limit of its travel, which ends the pawl carrying arm 146 to the limit of its back stroke. When, as cam 159 continues its rotation, roller 158 will be forced farther and farther away from the shaft 34, until the sides of the end of the cam 159 farthest from shaft 34 comes under the roller 158. Between these two points in the travel of the cam the rod 152 rises, swinging the pawls 147 forward and thereby rotating gear 144 in the same direction. This imparts rotation to the gears 142—143 and forward travel to the belts 124—125, thereby feeding the wrapping material forward into position over the frame 112.

The rotation of turn table 72 through 90° to bring the tablet into proper position above the wrapper on which it is to be placed also takes place while the wrapper feed is operating to place a wrapper in position to receive said tablet.

Directly after the wrapping material has thus been fed into position to receive the tablet from turn table 72, and the pawls 147 have started on their back travel, a series of blades 161, 162, 163 and 164 descend and for a moment press slightly into the wrapping material just sufficiently to indent it at the four corners of the tablet and hold it firmly while it is being sheared off, and to give the material a start into certain recesses in the frame 112 hereinafter described. These blades (see Figs. 22, 26 and 27) are carried by fingers 165, 166, 167 and 168, respectively, extending from a frame 169 which is yieldingly mounted by being made fast to two pins or studs 170 and 171 slidable vertically in two openings 172 and 173 in a bracket 174 bolted to the frame of the machine.

A spring 175 beneath frame 169 is placed under compression by its downward movement and returns the same to its normal position. The upward travel of said frame is limited and adjusted by screw 176 which passes through an opening 177 in said frame and screws into the bracket 174. Downward movement is imparted to the frame 169 to bring the finger blades into action, by a push rod 178 mounted in the machine frame for vertical movement and actuated by a cam 179, against the tension of a spring 180 on said rod, the said spring being held between a portion of the machine frame and a collar 181 fast on rod 178. (See Fig. 29 for details). This push rod is flexibly connected at its upper end through a link 182 to one end of an arm 183, mounted loosely on shaft 52, and held against lateral movement by collars 184, 185 fast to said shaft. This arm carries at its end opposite shaft 52 a roller 186 which engages the periphery of cam 179. The lower end of this rod 178 carries a screw 187 the head of which is adapted at times to engage the frame 169 and to press it down. This screw forms an adjustment by which the effective length of the rod 169 may be regulated.

The action of the cam 179, on the push rod 178 is as follows: Just as a tablet is about to come into position to be ejected from turn table carrier 72, cam 179 rotating in the direction of the arrow indicated in Fig. 29 will engage the roller 186, forcing the said roller together with the rod 178 downward. Continued rotation of the cam 179, however, for the next brief interval sends said roller and push rod quickly downward, sending the lower end of the push rod 178 through one of the openings 92 in the turn table 72, into engagement with the yielding frame 169, the said engagement taking place just as the roller 186 mounts the peak 187 of the cam. Then as said peak passes the roller the rod 178 will be pushed farther downward, sending the blades 161—164 into engagement with the wrapping material, slightly indenting it and holding it as described. Here the rod 178 pauses in its downward movement during the passage of the portion 188 of the cam past the roller 186. The cam 179 continuing its rotation, however, will force the push rod slightly farther down as the portion 189 of the cam passes the roller 186, and then as the abrupt turn 190 of the cam travels past roller 186 the latter will rise quickly under the tension of the spring 180 sending the rod 178 upward and allowing the yielding frame 169 to also rise quickly upward and resume its normal position. The rod 178 then pauses in this position until the cam 179 again engages and forces downward the roller 186. During this pause the cam 179 is most of the time entirely out of contact with roller 186.

Directly after the wrapping material has been fed forward and the blades 161—164 have descended upon it as described the portion of said wrapping material fed out through the slot 130 (Fig. 42) in position to receive the tablet, is severed from the rest of the wrapping material by a cutting or shearing mechanism which will next be described, reference being had particularly to Figs. 14, 34, 35, 42 and 43. This mechanism comprises, among other parts, a shearing blade 191 pivoted to move up and down against a stationary shearing plate 192 made fast to the frame 131 and forming the lower wall of the slot 130 through which the wrapper passes. The upper wall of said slot is formed by a flange 193 on the bottom edge of a plate 194 also made fast to said frame. The blade 191 is fulcrumed at one end on a stud bolt 195 carried in a lug 196 on frame 130, the said bolt holding said blade up against the shearing plate 192 under tension of a spring 197 carried on said bolt between lock nuts 198 thereon, and one end of a chamber 199 formed in lug 196. (See Fig. 43).

Motion is imparted at the proper times to blade 191 by a cam 200 (see Figs. 34 and 35) mounted fast on shaft 34 and engaging at intervals a roller 201 mounted on an arm 202 loosely fulcrumed on shaft 52, and pivotally connected at its outer end to a connecting rod 203 which is in turn pivotally connected to the upper end of a rod 204 slidable vertically in the machine frame and pivotally connected at its lower end to a connecting rod or link 205 pivoted as at 206 to said knife. The cam 200 is so set on shaft 34 that its raised portion will come into action on roller 201 and send the rod 204 down directly after the wrapping material has been fed into proper position to receive the tablet. When the cam 200 leaves roller 201, the rod 204 will be sent upward under the action of spring 207, being limited in said upward motion by a stop collar 208, fast on rod 204, engaging the frame of the machine, thus returning the blade 191 to its upper or normal position where it remains until the cam 200 again comes into engagement with roller 201. The arm 202 is held against lateral movement on shaft 52 between collars 209 and 210 fast on said shaft.

Just as cam 200 comes into action on roller 201, the mechanism which ejects the tablets from carrier 72 and places them on the wrapping material commences to operate, the tablet being in the position shown in Fig. 14, directly above the position it is to occupy on the wrapper. This ejecting mechanism, which also comprises a part of the mechanism for performing the first wrapping operation, comprises, among other parts, a rectangular plunger 211 fast on the lower end of a rod 212 mounted for vertical reciprocating motion in the guide 213 in the frame of the machine. This rod receives its reciprocating motion from a grooved cam 214 made fast on shaft 34, said rod being flexibly connected at its upper end through a link 215 to a roller 216 (Fig. 16) which travels in the groove 217 of said cam. This roller is mounted to rotate on a screw stud 218 passing through the upper end of link 215, and carried by one end of an arm 219, loosely mounted at its other end on shaft 52. This arm 219 is held against lateral movement on said shaft by collars 209 and 220, fast on shaft 52.

Referring now particularly to Figs. 14 and 16, when the tablet comes to rest beneath the plunger 211, the position of cam 214 is substantially as shown in Fig. 16, the said cam rotating in the direction of the arrow. When the roller 216 is passing from the full line position shown in Fig. 16, to the dotted line position 221, the plunger 211 descends rapidly, pushing the tablet out of the jaws of the rotary carrier 72 down upon the wrapping material and partly into an opening 222 formed in the flat top supporting frame or plate 112, hereinafter more particularly described. (Details in Figs. 22 to 27.) The tablet in the position which it occupies when first passing upon the wrapping material is clearly shown in Fig. 22. The said plunger, however, does not stop in this position, but continues down until about half of the said plunger has passed into the opening of frame 112, pushing the tablet before it down through said opening. The plunger then pauses in this position momentarily, while certain jaws hereinafter described close in on and flatten down the four corner flaps 5 of the tablet. This pause takes place as the roller 216 passes from the dotted line position 221 to the dotted line position 223 indicated in Fig. 16. The cam 214 continuing its rotation will then cause the plunger 211 to again take up its downward movement, which it will do as the roller 216 passes from the dotted line position 223 to 224. In this portion of its downward travel the plunger 211 pushes the partially wrapped tablet farther down into a rectangular opening 225 in a second rotary carrier or turn table 226 hereinafter described.

It will of course be understood that the roller 216 really moves up and down in the arc of a circle, and that the dotted circles 221, 223, 224 and 227 merely show positions of the roller 216 relative to the cam groove.

When the plunger 211 reaches the limit of its downward travel it starts back up again with great rapidity occasioned by the passage of the roller 216 from the dotted line position 224 to the position 227 the latter position being that of the roller when the rod about reaches the end of its up travel. To prevent this rapid upward movement of the plunger 211 from possibly pulling the tablet upward, I provide means which will momentarily hold the said tablet down during this movement of the plunger. This means comprises a rod 228 mounted in the longitudinal axis of plunger rod 212 for vertical reciprocating motion therein, the said rod 228 being held normally up under tension of a spring 229 mounted thereon and engaging at one end the bottom of a channel 230 of the plunger rod and at its other end a collar 231 mounted fast on the rod 228. The upper end of rod 228 extends a short distance above the upper end of rod 212, and in line with the periphery of the cam 214, while the bottom end of said rod passes down through the plunger head and projects at times beyond the lower face of said head as will now be described. As soon as the rod 212 begins to rise from the lower limit of its travel, a lug 232 on the outer periphery of cam 214 engages the upper end of the rod 228 and holds it for a short interval of time against upward movement while the rod 212 is traveling upward, thus holding the lower end of rod 228 against the top of the tablet while the plunger head 211 is ascending. When the cam lug 232 passes the upper end of the small rod 228, the said rod will ascend with the rod 212, commencing the said ascent gradually as the upper end of said rod travels along the inclined portion 233 of said cam lug.

Returning now to the frame 112 and its related mechanism, these are shown most clearly in Figs. 22 to 25, 14 and 28. This frame extends outward from bracket 174 bolted to the machine frame as shown, and is provided with a flat upper face through which extends the opening 222. Also extending through this plate are four slits or openings 235, one at each corner of the opening 222, while on the lower face of this frame are four downwardly extending plates 236, 237, 238 and 239, forming a downward continuation of each of the sides of the opening 222, the said plates being separated from each other longitudinally by spaces 240 registering with the slits 235. It will be readily seen from this construction that as the tablet is pushed with the wrapper down through this chute or pocket formed by the plates 236—239, the four corners of the wrapper will be drawn into a vertical position, such as shown in Fig. 3, and carried downward against the inner walls of the four plates 236—239. The wings or flaps 5 at the four corners of the wrapper are formed by the creased corners being drawn into the slits 235. These corner flaps then pass on down into and extend out through the openings or spaces 240 between the plates 236—239. The tablet with its wrapper in this condition is pushed on down into the chute formed by plates 236—239 until it reaches a position where it pauses. During this pause, the corner flaps or wings of the wrapper are folded flat against the outer faces of plates 236 and 239. These two plates, as will be seen, are made very thin to take up as little space between the side of the tablet and the flaps 5 as possible. The folding of these corner flaps against the sides is effected by a pair of jaws 241 and 242, closing in toward each other close to the two sides 236 and 237 of the said chute. These jaws comprise each a yoke having L-shaped arms 243 and 244, respectively, as shown most clearly in Fig. 28. The forward edges of these arms are preferably rounded as indicated at 245. These jaws are mounted for sliding movement on rods 246 and 247, respectively; the former being supported by a block 248 fast to the frame 112, and also by plate 239; while the rods 247 are supported by being made fast to plate 237. These jaws are so placed on said rods that when moved inward their arms 243 and 244 pass close to the sides of plates 236 and 238, thus gathering in the corner flaps of the wrapper which at that time extend out through the corner slits or openings between the plates 236 to 239 into the path of the said jaw arms. Parallel sliding motion is imparted to said jaws through a system of levers, shown most clearly in Figs. 23 and 24, and comprising a lever 249 pivoted as at 250 to the frame 112, and connected through a slot 251 and screw 252 to the yoke of jaw 242, a lever 253 pivoted to said screw 252 at one end and at its other end to a bell crank lever 254 pivoted as at 255 on frame 112, and connected through slot 256 and screw 257 to the yoke of jaw 241.

Secured to an arm of lever 254 is a flat blade 258 which, when the jaws 241—242 are in the outward position as shown in Fig. 23, is thrown partly across the bottom of the chute or pocket formed by the four plates 236—239; the function of said blade being to prevent the tablet from passing entirely through the chute until the proper time. When the jaws 241, 242 close in, however, this supporting arm is withdrawn to the position shown in Fig. 24, so as to allow the partially wrapped tablet to pass on downward as hereinafter more particularly described. The movement of jaws 241, 242 is controlled by a cam 259 (Fig. 30) mounted fast on shaft 34. The periphery of this cam engages a roller 260 carried on the upper end of an upright lever 261 fulcrumed on shaft 262, and pivotally connected at its lower end to a link 263, pivotally connected to an arm of lever 249. The roller 260 is held against the periphery of cam 259 under tension of spring 264.

When the raised portion of cam 259 comes into engagement with the roller 260 it moves the lower end of lever 261 against the tension of spring 264, and thus, operating through levers 249, 253 and 254 brings the jaws 241 and 242 together. The jaws 241, 242 and the lever systems are merely indicated in Fig. 30 to show their operative connection with lever 261, the blade 258 being omitted. Cam 259 is so shaped as to cause this operation to take place very quickly. Then, as the roller 260 is passing over the raised portion of said cam concentric with the shaft 34, there will be a momentary pausing of the jaws 241, 242 in the closed position. Cam 259 continuing its rotation, causes its raised portion to pass from said roller, suddenly bringing the roller to the curved concentric portion of the cam nearest the shaft 34. In making this passage the roller 260 is drawn quickly inward toward said shaft by the spring 264. This throws the lower end of lever 261 to the right, Fig. 30, thus opening the jaws 241, 242. The cam 259 is so set on the shaft 34 as to time these operations to take place at the proper intervals with respect to the passage of the partially wrapped tablet through the closure formed by the plates 236—239.

The tablet now partially wrapped as indicated in Fig. 4, is pushed by the plunger 241 in its continued downward travel, into one of the rectangular openings 225 in the rotary carrier or turntable 226. This carrier consists of a plate having eight radial arms in each of which is formed one of the rectangular openings 225 of such a size as to make a close fit with the wrapper on the tablet. The tablets, however, when thus placed in the opening rest upon the solid portion 265 (see Fig. 60) of a circular stationary plate 266, supported at three points upon pins 267 so as to lie just beneath the path of the openings 225 in the carrier 226. The pins 267 extend into openings 268 in the main frame of the machine and at their upper ends into openings 269 formed in lugs 270 on the bottom of the plate 266. Each of the pins 267 is provided with a flange 271 which rests upon a collar 272 on the machine frame, as shown most clearly in Fig. 14. The plate 266 is drawn down firmly on the pins 267 by a bolt 273 (see Fig. 44) which extends through an opening in the frame of the machine and screws into said plate from its bottom side.

The carrier 226 is made fast by set screws 275 to the upper face of a disk 276 formed on the upper end of a vertical shaft 277 journaled in the machine frame. This shaft receives intermittent rotary motion through the gear 102 made fast thereon, and comprising one of the train of intermittently rotating gears heretofore described. Unlike the shaft 75, however, the shaft 277 rotates, at each turn, through the space of only an eighth of a revolution or 45°.

Immediately after the partially wrapped tablet is placed as described in the opening 225 in the turn table carrier 226, the latter rotates 45°, bringing the tablet with its corners extending upward as shown in Fig. 4, into position where these four corners are pressed down, the said turn table pausing in its rotation long enough to allow this operation to take place. In this position the tablet rests upon the solid portion 265' of plate 266. (See Fig. 60.) The mechanism for effecting the folding or turning down of these corners of the wrapper comprises, among other parts, (see Figs. 31 to 33 for details) a folding member 279 provided with four downwardly extending fingers 280, 281, 282 and 283, each of which is flared at its lower end, and provided with an outwardly extending flange 284. The centers of these flanges are 90° apart, and the breadth of the lower flared ends and flanges of the fingers 281 and 283 is slightly less than the distance across the top of the tablet so that these fingers may travel between two upturned corners of the wrapper as indicated in Fig. 32. The other two fingers are slightly wider than the tablet, as shown most clearly in Fig. 33. This member 279 is made fast to a stud 285 extending downward from and fast to a frame 286, and this frame is mounted for lateral sliding movement in a second frame 287, the sides of which are cut away as at 288 to form in connection with plates 289 screwed over the top of its sides, slide ways for the frame 286. The frame 287 is in turn mounted for sliding movement in a frame comprising a yoke 290 having two arms 291 and 292 provided with slide ways 293 and 294 which receive the ends of the frame 287. The yoke 290 connecting the arms 291 and 292 is made fast to or integral with a crosshead 295 which is mounted for vertical movement in ways 296 and 297 in a bracket or stand 298 bolted to the machine frame.

Mounted on top of the frame 286, in line with the axis of the stud 285 is a small elongated roller or collar 299 which is held in position by means of a screw 300. This roller is held between two members 301 and 302 of a bifurcated arm 303 made fast to a vertical spindle 304 journaled to rotate to a limited extent in the yoke 290 and in a lug 305 on the cross-head 295. Made fast to the upper end of this spindle is a horizontal arm 306 having a head 307 in which is rotatably mounted a spindle 308. To this spindle is pivotally connected one end of an arm 309 (see Fig. 31) the other end of which is pivotally connected to a screw threaded stud 310 which forms the connection between said arm 309 and the lower end of a lever 311. The stud 310 is provided with a reduced portion 312 which passes through the opening 313 in the lower end of lever 311, the said lever being held on said stud by nut 314.

The frame 287 is connected to the lower end of an upright lever 315 by a horizontal pin 316 carried by lugs 317 the said pin 316 engaging a slot 318 in the lower end of said lever.

The levers 311 and 315 are mounted upon shaft 262 as a common fulcrum (see Fig. 34) and carry at their upper ends rollers 319 and 320, respectively. The roller 319 is adapted to press against the periphery of a cam 321 under tension of a spring 322, and the roller 320 is similarly held against the periphery of a cam 323 by spring 324, the said springs being connected to said levers and to an arm 325 extending from the bracket 298. (See Figs. 12 and 14.)

The upper end of crosshead 295 is flexibly connected by link 326 to one arm of a bell crank lever 327, the other arm of which carries a roller 328, adapted to engage the periphery of a cam 329 fast on shaft 34. The weight of crosshead 295 is sufficient to keep said roller against the cam without the aid of a spring.

Figure 5:
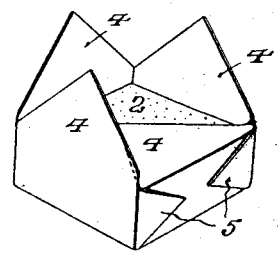
Figure 6:
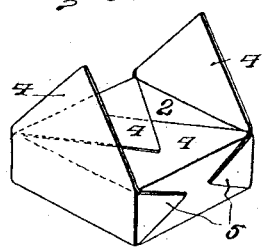
Figure 7:
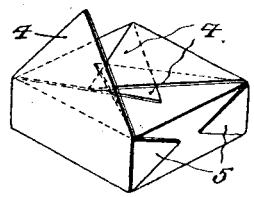

The partially wrapped tablet being now brought around to position to be operated on by this mechanism, that is, directly beneath the center of the folding member 279, the operation is as follows: The first operation is the lowering of the member 279 so that the lower edges of its fingers will be about on a level with the top of the tablet. This is effected by cam 329 allowing roller 328 to advance toward the shaft 34, thereby allowing the crosshead 295 to descend to the proper level. The next operation is the sending of the lower end of lever 315 to the left (Fig. 34) which is caused by the passage of the roller 320 past the cam peak 330 rapidly inward toward the shaft 34. This causes member 279 to slide to the left or outward, carrying the finger 283 far enough across the top of the tablet to flatten the upwardly extending corner, which it engages, down as shown in Fig. 5. The finger 283 in the act of thus moving across the tablet is clearly shown in Fig. 32. The roller 320 will then mount the peak 331 of its cam, forcing the lower end of lever 315 to the right, Fig. 34, thereby pulling the member 279 backward and causing the finger 283 to back off the tablet, and the finger 281 to advance across the tablet, engaging the opposite upstanding corner of the wrapper from the one first turned down, and, passing over this, turns it down so that the wrapper is as shown in Fig. 6. When the finger 283 recedes in the forward motion of finger 281, it does not travel, while passing over the wrapper, in the same horizontal plane as that in which it advanced, but is lifted slightly to prevent the edge of its flange from catching the turned down corner of the wrapper. This is effected by roller 328 passing over portion 332 of cam 329 (see Fig. 36) thus pressing the roller arm of lever 327 slightly down and momentarily raising crosshead 295. As the roller 320 passes the peak 331 of cam 323, the lever 315 sends the fingers 280–283 back to the initial position, and the lever 315 pauses while the concentric portion 333 of the cam 323, is passing its roller. As these fingers are thus returned and finger 281 recedes across the tablet it, like the finger 283, is lifted slightly by cam 329 as pointed out with reference to that finger. This takes place as roller 328 mounts the elevated portion 334 of its cam. Two of the wrapper corners are now turned down as shown in Fig. 6. After the cam 323 has done its work as described, the cam 321 comes into play, and, acting in a similar way on lever 311 will send the bifurcated arm 303 first to the left (Fig. 15), and then to the right causing the fingers 282 and 284 to pass over the remaining upturned corners of the wrapper just as described with relation to the first two. The four positions that the fingers 281 to 284 occupy in passing through this operation are clearly understood in dotted lines in Fig. 33.

In passing across the down turned corners on the back travel, the fingers 282 and 284 are lifted through the action of cam 329 on vertically movable crosshead 325 as described in relation to the fingers 281 and 283, the lifting in the case of fingers 282 and 284 taking place as the roller 329 mounts the elevated portions 335 and 336 of said cam. As the roller 328 mounts the last cam elevation (336) the crosshead 295 rises and continues to do so for a time until all of the fingers of member 279 are lifted well up out of the path of the tablet. During this time the portion of cam 329 between portion 336 and roller 328 (Fig. 36) is passing said roller. The tablet being now wrapped as indicated in Fig. 8, continues its travel, being carried by the turn table 226 to the next stopping position 45° from where it has previously stopped, the tablet in this position being over the solid portion 265'' of plate 266, (see Fig. 60). As soon as the tablet reaches this position a flat bottomed rectangular plunger head 337 passes downward and presses on the top of the wrapped tablet. This absolutely flattens the wrapper down on the tablet. Plunger 337 makes a very close fit with the openings in the turn table 226 in which the tablets are carried, and if there are any bulging portions of the wrapper, these are absolutely flattened by the action of the said plunger.

Not only does the plunger 337 flatten down the top of the wrapper, but it has a compressing action in the case of a soft substance such as yeast, creating a pressure between the sides of the wrapper and the walls of the turn table opening in which it is held, thereby securely flattening the flaps 5 against the sides of the tablet. The plunger 337 is carried on the lower end of a rod 338 mounted for vertical movement in lugs 339 on a bracket 340 bolted to the frame of the machine (see Fig. 44). Rod 338 receives vertical reciprocating motion from a rocking arm 341 fast on shaft 52 and connected to rod 338 through rod 342. The connection between the lower end of connecting rod 342 and plunger rod 338 is a simple pivot consisting of a screw or bolt 343 passing through the ends of said rods; but the connection between the arm 341 and connecting rod 342 involves a construction which it is necessary to go into more or less in detail. (See Fig. 44.) The arm 341 is preferably cast with a cylindrical portion 344 and a flat web 345, extending through the axis of the portion 344 is a screw threaded opening adapted to receive a set screw 346. Registering with the lower end of this opening is a slot 347 in the web 345, and resting in the bottom of this slot and extending transversely across said web is a pivot screw or bolt 348 carried by the upper end of the connecting rod 342 which is bifurcated at that end to receive the web 345 of arm 341. Mounted in the slot 347 and the screw threaded opening in arm 341, between the screw 346, and pivot bolt 348, is a coil spring 349. The tension of this spring is regulated by the screw 346 which is locked in an adjusted position by lock nut 350. The pressure of the plunger 337 on the tablet is effected by the continued movement of the arm 341 down a short distance after the plunger has engaged the tablet, thereby forcing said plunger down against the yielding pressure of spring 349.

The shaft 52 has a constant rocking motion imparted to it from a disk 351 fast on the constantly rotating shaft 34, the said disk being provided with an eccentric groove 352 in which travels a roller 353 mounted on one end of an arm 354 fast at the other end on the shaft 52. As the disk 351 rotates continuously, a continuous rocking motion will by this connection be imparted to shaft 52. The plunger 337 therefore moves up and down at regularly recurring intervals so timed that the said plunger will descend upon the tablet immediately after the turn table 226 has brought it into position under said plunger, where it stops momentarily. This plunger thus descends upon the several tablets successively as they come into registering position beneath it.

The tablet which we are now following through the various operations having received the action of plunger 337, and said plunger having receded upward from the tablet, the turn table carrier 226 then rotates another step, or 45°, and stops again for a brief interval. This brings the tablet around to a point where the upper face of its wrapper receives its coat of adhesive material. In this position the tablet rests above solid portion 265''' of plate 266 (Fig. 60). The mechanism for performing this operation is shown most clearly in the detail views Figs. 45 to 49, inclusive.

The mucilage, liquid glue or other adhesive substance is applied to the upper face of the wrapper by means of a strip of sponge 355 long enough to extend across the tablet and clamped between the edges of a bent plate 356, carried in a slot 357 in the head 358 of a lever 359. One of the edges of the plate 356 is grooved as at 360 to more firmly grip the sponge. This gripping plate is held securely in position by milled screws 361 which are locked by screws 362. By this arrangement the sponge 355 may be quickly and easily changed. Lever 359 is fulcrumed on a stud 363 carried by an angle bar 364 mounted for horizontal reciprocating motion in a block 365 forming a part of a bracket 366 bolted to the machine frame.

As indicated in Fig. 47 the bar 364 is just about to start on its forward travel to carry the sponge 355 across the tablet. At the commencement of such motion the head of the lever 359 drops to a position where said sponge will be brought into contact with the tablet wrapper, across which it travels as the block 364 and lever 359 travel in the direction of the arrow Fig. 47. As soon, however, as sponge 355 has passed over the tablet, it rises again to the level indicated by the broken line in said figure, and continues to the limit of its travel where it comes into engagement with a stationary sponge 367, soaked with the adhesive substance which it absorbs from a supply thereof carried in a receptacle 368 secured to bracket 366. Sponge 367 is clamped between a serrated plate 369, and the forward edge of receptacle 368, the said plate being screwed down on a stud 370, extending up from the bottom of said receptacle.

The adhesive material which is in a liquid state may be supplied to receptacle 368 from a larger supply receptacle 371 carried on an upright or stem 372, adjustably mounted in an upright 373 on the machine frame. This last named receptacle is provided with a small cock 373' through which the said adhesive substance is supplied to a trough 374 formed on the receptacle 368, and leading thereinto as shown most clearly in Fig. 45. A drip pan 375 secured by means of a hanger 376 to bracket 366, is provided to catch such of the adhesive substance as may be carried over the edge of the tablet by sponge 355 in its travel, or drippings from the sponge 367.

On its return travel from the sponge 367 to the position shown in Fig. 47, the sponge 355 follows the elevated course indicated by the broken line in that figure.

For the purpose of imparting the dipping and rising motion described, to sponge 355, the lever 359 carries near its end opposite the sponge head 358, a cam lug 377 which, when said lever is carried in the direction of the arrow Fig. 47, rides up on a downwardly curved plate 378 carried on an arm 379 pivoted at one end to an arm 380 connected by a screw and slot connection 381, 382 to the stationary block 365. The arm 380 is held by the screw 381 rigidly in the proper adjusted position. When the cam 377 rides up on the plate 378, the sponge head 358 is sent downward so as to bring the sponge 355 into engagement with the tablet wrapper. The length of the plate 378 is, however, such that by the time the sponge 355 has passed over the tablet, the cam 377 passes over the rear end of said plate which supported the said cam against the tension of a spring 383, secured at one end to lever 359 and at its other end to an upright 384 on a lever to be later described. Therefore, when the cam 377 passes off the rear end of plate 378, the sponge head of the lever 359 will rise, bringing the sponge 355 again to the path of the broken line Fig. 47. During the travel of the sponge 355 back to the position shown in this figure, from the stationary sponge, the cam lug 377 passes beneath the plate 378 forcing said plate upward on its pivot. Therefore no dipping of the head 358 will occur.

The crosshead 364 carrying the lever 359 receives its reciprocating motion from a rocking arm 385 to which it is flexibly connected by a rod 386. This arm is formed on one end of a sleeve 387 mounted to rock on a stud 388 screwed into a bracket on the machine frame. The sleeve 387 is also provided with an arm 389 one end of which is pivotally connected to a link 390 which, at its other end, is pivoted by means of a stud 391 to a collar 392 fast on a rod 393 mounted for vertical reciprocating motion in the machine frame. The upper end of this rod is flexibly connected through a link 394 to one end of the rocking arm 354 mounted at its other end fast on shaft 52. The connection between the link 394 and arm 354 is effected by a stud bolt 396 which carries the roller 353 hereinbefore referred to. It will therefore be seen that as the shaft 34 rotates the disk 351, vertical reciprocating motion will be imparted to the rod 393, and this will in turn impart horizontal reciprocating motion to the crosshead 364, causing the sponge lever 359 to travel back and forth as described.

The adhesive substance having been applied to the top of the wrapper, the turn table 226 rotates another eighth of a revolution and passes with the tablet in position to receive the label. Here the tablet rests above portion 265'''' of plate 266. The mechanism for applying these labels comprises, among other parts, a rotary carrier consisting of a plate 400 having a hub 401 through which extends a vertical shaft 402, the said hub being made fast to said shaft by pin 403 (Fig. 51). The axis of shaft 402 is in alinement with the axis of shaft 106, and the lower end of shaft 402 extends into an axial chamber or opening 404 in a cylindrical head 405 formed in the upper end of shaft 106. Shaft 402 is adapted to slide vertically in said head, but is held against rotation relative thereto by a key 406. The head 405 rests in a recess 407 and rotates in a hard steel bushing 408 in said recess. The shaft 402 above the carrier extends through a collar 409 formed on a bracket 410 fast on the lower end of the vertically reciprocating rod or shaft 393. The collar 409 is adapted to slide on the rod 402 longitudinally thereof and in its upward travel engages a leather washer 411 carried on the lower face of a collar 412, fast on the upper end of the shaft 402.

The carrier plate 400 is provided with a series of rectangular label holding pockets 413 arranged in a circle concentric with the axis of rotation of the carrier and are spaced equally, their centers being 45° apart. The labels are placed in these pockets in packs or stacks as indicated in Fig. 54, back side down, and are supported upon two ledges or flanges 414 and 415 extending along the bottom edges of two sides of each of said pockets. The stacks of labels when placed in these pockets are bent so that the bottom face of each label is convex, the upturned edges of the labels resting upon the ledges 414, 415. In the present instance, the labels are supposed to be square, and fit loosely into the pockets, the central convex lower face of the bottom label extending slightly below the bottom of the pockets when the labels are lifted from the tablet.

The shaft 106 rotates intermittently at regular intervals, causing the carrier 400 to rotate through an angle of 45° at each step, the said shaft receiving this intermittent motion through disk 105 and its associated parts, as described. Each of these rotations of the shaft 106 brings a label pocket 413 into position directly above the tablet where it stops to receive the label.

The rotation of the label carrier takes place each time when the rod 393 is at the limit of its up-stroke, at which times, collar 409 has engaged collar 412 and thereby lifted the shaft 402 and label carrier, holding the latter up clear of the turntable 226 which at this time is rotating to bring a tablet into position to be labeled. Then, as soon as said tablet is brought into said position, where it stops as described, the rod 393 descends, and with it the label carrier, until the stack of labels in the pocket now above the tablet comes down on top of the tablet as indicated in Fig. 53. At this time the hub of the label carrier rests upon a leather or other suitable washer 416 on top of the head 405. The rod 393 continues in its downward travel after the carrier 400 has reached the limit of its downward travel and brings a yielding plunger down upon the top of the labels pressing them down on the tablet. This plunger consists, among other parts, of a plate 417 having a convex bottom face curved to fit down into the concavity of the label stack, and mounted for angular side to side movement on a pin 418 extending through the bifurcated lower end of a bar 419 and through an upright stem 420 fast to the top of plate 417. The said plate is movable on said pivot against the pressure of two coil springs 421 and 422 carried upon a pin 423 mounted in two arms 424 and 425 fast to the bar 419, said pin passing through an enlarged opening 426 in the upper end of the stem 420. The bar 419 is mounted to slide vertically in an arm 427 of bracket 410, the said arm being provided with a chamber 428, through which the bar 419 passes. The portion of said bar within this chamber is provided with a slot or opening 429 in which rests a coil spring 430. The lower end of this spring engages the bottom of slot 429 and the upper end engages the top of chamber 428. One of the walls of chamber 428 is a detachable plate 431 screwed to arm 427. The bar 419 carries at its upper end outside the arm 429, a pin 432 by which the bar 419 is lifted in the up-travel of bracket 410.

As rod 393 continues it downward travel after the carrier 400 has been lowered as described, it brings the plunger 417 down on the stack of labels, and as the said rod thereafter continues to descend, the said plunger will be forced against the labels, placing spring 430 under compression by the relative movement of bar 419 and arm 427. This causes the bottom label to adhere to the coating of adhesive substance on the upper face of the tablet wrapper. The rod 393 then commences its upstroke, but the bar 419 will lag under pressure of the spring 430 until the top of arm 427 engages the pin 432, when the plunger 417 will also be carried upward. Continued upward travel of the rod 393 brings collar 409 into engagement with collar 412, thereby lifting the label carrier as described, leaving the bottom label of the stack on the tablet.

The label now being on the tablet, turn table 226 rotates another 45°, and stops momentarily. This brings the tablet into position to be ejected from the machine. The mechanism for performing this last operation comprises, among other parts, a plunger rod 433 having a rectangular head 434 and mounted for vertical movement in a bracket 435 bolted to the machine frame, as shown most clearly in Fig. 44. The head 434 consists of a square plate the periphery of which is slightly smaller than the openings in turn table 226 which carry the tablets, so that it may pass down into said openings. This plate or head is provided on its lower face with two flanges 436 extending along two of its opposite edges. The function of these flanges will more readily appear later. The upper end of rod 433 is pivotally connected to a link 437 which is in turn pivotally connected to one end of an arm 438 fulcrumed loosely on the shaft 52 and held against lateral motion thereon by collars 439 and 440 fast on said shaft. The arm 438 carries a roller 441 which engages a groove 442 in an eccentric disk 443 fast on shaft 34. Therefore, as shaft 34 rotates constantly during the operation of the machine, a regular periodic up and down motion will be imparted to the plunger rod 433, causing the head 434 to descend upon the tablets as they are brought successively into the ejecting position and force them out of the turn-table 226, when they drop into a chute 444 attached to the machine frame. The flanges 436 on the plunger head engage and press firmly down upon the edges of the label which rested on the ledges 414, 415 of the label carrier, and which therefore have a tendency to rise. This arrangement, however, positively flattens down these edges and causes them to stick to the adhesive material.

The periodic operation of the ejector is so timed with relation to the step-by-step rotation of the turn table 226 that each time the plunger descends, there will be a tablet in position to receive it.

In handling some substances such for example as yeast it is important to prevent some portions of the machine from becoming "gummed." For this purpose, I provide in the present machine three brushes 445, 446 and 447. The brush 445 is made fast to the stationary frame of the machine as shown most clearly in Fig. 14, and its bristles impinge on the lower face of the tablet holding jaws of carrier 72. The brush 447 is mounted in a bracket 448 made fast to turn table 226 between two arms thereof as shown most clearly in Figs. 15 and 59, and its bristles impinge on and keep clean the upper face of plate 266. The brush 446 is adapted to reciprocate vertically and is mounted on the lower end of a rod 449, adapted to reciprocate vertically in bracket 43. This rod receives its motion from the arm 55 made fast on rock shaft 52, the said arm being connected to said rod by connecting rod 450. (See Figs. 11 and 16). The vertical movement of rod 449 is so timed with relation to the step-by-step movement of carrier 72 that each time the latter stops the brush 446 will pass downwardly into the opening between the pairs of said carrier and then up again in time to clear the path of the said carrier before the latter again takes up its rotation. This brush 446 corresponds substantially to the shape of the opening it is designed to pass into, so that its sides will engage all the side walls and corners of said opening.

In the operation herein described, it has been assumed that the tablet was of less than maximum thickness, but it was shown how the adjustment of the block 57 was effected for cutting tablets of greater or less thickness. Another adjustment which is made in changing from a tablet of one thickness to one of a different thickness is the adjustment of turntable 226 and plate 266 so that the depth of the openings 225 shall correspond substantially to the thickness of the tablet and the plate 266 lie flat against the bottom of said openings. In the present machine this adjustment is effected by having a plurality of turn table plates 226, the depth of the openings 225 or the thickness of the arms in which these openings are formed, corresponding to the particular thickness of the tablet to be handled, and using the turn table corresponding to that particular tablet. Of course when these turn tables are changed this calls for a change in the elevation of plate 266. This may be effected in a number of ways one of which is by providing supports having pins 267 of lengths corresponding to the various elevations of the said plate and using the proper pins for the respective elevations.

We have now followed through the complete operation of cutting, wrapping and labeling a tablet. It will be seen, however, that the machine does not perform these operations on one tablet at a time. Each time the carrier stops some one of said operations is performed on a different tablet, making the operation practically continuous. For example, except in the two stopping positions between the ejecting position and the first wrapping position, each opening 225 in said turntable carries a tablet, and in each stopping position of said turn table each tablet has a different operation performed on it. It will also be noted that the label carrier provides for the carrying of a plurality of separate label stacks which are brought successively into the operating position. This arrangement renders the replenishing of the labels without interfering with the operation of the machine, a very easy matter. It also makes it possible to apply a number of different kinds of labels without stopping the machine to change them. The chief advantages of the labeling mechanism, however, are its simplicity and positive action.

Having now described a specific embodiment of my invention, I shall next point out what I claim, it being understood that the machine thus described may be modified or changed without departing from the true spirit of my invention.

What I claim is:

1. A wrapping machine, comprising a carrier adapted to support and transport the articles to be wrapped, a support upon which a piece of wrapping material is adapted to rest, the said support having an opening registering with the position the article occupies on said material and radial slots leading into said opening, mechanism to indent said material into said slots, and a reciprocating pusher acting subsequently to said indenting mechanism to push said article and material into said opening.

2. A wrapping machine comprising an opened cornered chute, means to feed wrapping material into position over said chute, positioning means adapted to bring the articles to be wrapped successively into a predetermined position with relation to said wrapping material and in alinement with said chute, mechanism to indent said wrapping material into the upper ends of the open corners of said chute and means acting subsequently to said indenting mechanism to push said article with its wrapper through said chute.

3. A wrapping machine, comprising an opened cornered chute, means to feed wrapping material into position over said chute, positioning means adapted to bring the articles to be wrapped successively into a predetermined position with relation to said wrapping material and in alinement with said chute, mechanism to indent said wrapping material into the upper ends of the open corners of said chute, means acting subsequently to said indenting mechanism to push said article with its wrapper through said chute to fold the said wrapper against the sides of the said article, flaps or wings of the wrapper extending outward through the corner openings in said chute in the passage of the article therethrough, and mechanism to fold said wings inward toward the sides of the article while the latter is in said chute.

4. A wrapping machine, comprising a chute having radial slots, means to feed wrapping material into position over said chute, positioning means adapted to bring the articles to be wrapped successively into a predetermined position with relation to said wrapping material and in alinement with said chute, mechanism to indent said wrapping material into the upper ends of the open corners of said chute, mechanism acting subsequently to said indenting mechanism to push said article with its wrapper through said chute to fold the said wrapper against the sides of the said article, corners of the wrapper passing through said radial slots and extending out between the sides of said chute, and oppositely moving jaws coöperating with said chute to fold the portions of the wrapper extending through said chute.

5. In a wrapping machine, a turn table carrier comprising a plate having a plurality of radially disposed serrated portions forming fixed jaw members, a plurality of angle plates, one for each of said fixed jaws mounted for movement toward and away from the respective fixed jaws, the said angle plates themselves forming movable jaws, cam operating means to automatically move the movable from the fixed jaws, springs resisting said movement and automatically returning the said movable jaws to the closed position, and means to impart step-by-step rotary motion to said turn table and thereby bringing said jaws successively into position to be operated by said cam operating means.

6. In a wrapping machine, the combination with a rotatable carrier adapted to receive and transport the articles to be wrapped, of a frame having an opening therein, means to feed the wrapper into position above said opening, a plunger adapted to push said articles out of said carrier on to said wrapper and thence down into said opening whereby the wrapper is turned up around the sides of the articles, the said plunger on its further travel ejecting said partially wrapped articles from said opening, a carrier having an opening passing through it into which articles are fed from the first mentioned opening, and mechanism acting on said articles while in said second mentioned carrier to turn the upturned portions of the wrapper down, and a reciprocating plunger operating to push the wrapped article through said opening in the second mentioned carrier.

7. In a wrapping machine, means for holding bars of plastic material, means to cut said material to form tablets, a rotatable carrier adapted to receive and transport said tablets, a chute having open corners, means to feed the wrapper into position above said chute, means to push said tablets out of said carrier on to said wrapper and thence down into said chute whereby the corners of the wrapper are turned up around the sides of the tablet and a flap of the wrapper formed at each corner of the tablet, means to fold said flaps over toward the sides of said tablet while in said chute, the said pushing means on its further travel ejecting said partially wrapped tablet from said chute, a traveling carrier into which said tablet is fed from said chute, and mechanism acting on said tablet while in said second carrier to turn the upturned corners of the wrapper down over the upper face of the tablet.

8. In a wrapping machine, the combination with an open cornered chute, a plunger adapted to coöperate therewith in wrapping the articles, mechanism to operate said plunger, a plurality of jaws mounted for movement close to the sides of said chute and adapted to engage the wrapper extending therethrough and fold the same down, a system of levers for imparting parallel motion to said jaws simultaneously in opposite directions, and mechanism to operate said levers.

9. In a wrapping machine, a wrapping member having a plurality of fingers, means to hold a partially wrapped article into a predetermined position relative to said member, the wrapper of said article having upturned portions to be turned down against the face of the article, and means to impart motion to said member in a plurality of directions transversely of the face of the partially wrapped article and in engagement successively with said upturned portions of said wrapper.

10. A wrapping machine, comprising a wrapping member having a plurality of fingers for folding the wrapper down on the article to be wrapped, mechanism to impart movement to said members in a plurality of paths in a horizontal plane, and mechanism co-acting with said last named mechanism to impart to said member a composite horizontal and vertical movement.

11. In a wrapping machine, a wrapping member having a plurality of substantially rigid fingers adapted to span the article to be wrapped, a carrier adapted to hold a partially wrapped article into a predetermined position relative to said member, the wrapper of said article having upturned portions to be turned down against the face of the article, and means to impart motion to said member in a plurality of directions transversely of the face of the partially wrapped article and in engagement successively with said upturned portions of said wrapper.

12. A wrapping machine, comprising a wrapping member having a plurality of fingers adapted to fold the wrapper, a supporting member on which said wrapping member is mounted, a second supporting member in which said first supporting member is mounted for sliding movement, a third supporting member in which said second supporting member is mounted for sliding movement in a different direction from that of the first supporting member, and mechanism for imparting said movements to said members.

13. A wrapping machine, comprising a wrapping member having a plurality of fingers adapted to fold the wrapper, a supporting member on which said wrapping member is mounted, a second supporting member in which said first supporting member is mounted for sliding movement, a third supporting member in which said second supporting member is mounted for sliding movement in a different direction from that of the first supporting member, a cam for each of said supporting members, and levers connected respectively to said supporting members and to their respective cams for operation by said cams, the said third supporting member being movable in a plane substantially at right angles to the main plane of movement of the other two members.

14. A wrapping machine, comprising a wrapping member provided with a plurality of fingers adapted to span a partially wrapped article and fold the wrapper down thereon, a supporting frame on which said member is rigidly mounted, a second supporting frame in which the first mentioned frame is mounted for sliding movement, a third supporting frame in which the second mentioned frame is mounted for sliding movement in a different direction from first mentioned movement, a lever connected to the first mentioned frame for imparting movement to it in one direction, a lever connected to the second mentioned frame for imparting movement to it in another direction, cams operating the respective levers, whereby the said fingers are made to travel transversely of the partially wrapped article in a plurality of directions and thereby fold the wrapper down on the article, a vertically movable support on which the third mentioned frame is mounted, a lever connected to said support, and a cam adapted to operate said lever to raise and lower said support, substantially as described.

15. In a wrapping machine, the combina tion with positioning mechanism adapted and arranged to place the article to be wrapped in a predetermined position on the wrapping material, mechanism to turn corners of the wrapper up in substantially vertical planes around said article and to simultaneously form wings or flaps between said corner pieces, mechanism to turn all said flaps simultaneously inward against opposite sides of said article, and mechanism to automatically turn the upturned corners of the wrapper down over the top of the article.

16. In a machine adapted to wrap rectangular tablets and the like, the combination with positioning mechanism adapted and arranged to place a tablet on a piece of rectangular wrapping material with the sides of the tablet disposed respectively at angles of substantially 45° to the edges of the wrapper, mechanism to turn the four corners of the wrapper simultaneously up into four substantially vertical planes surrounding the tablet, and to form at each corner of the tablet a wing or flap between said upturned portions, mechanism to simultaneously turn said flaps in pairs inward against two opposite sides of the tablet, and mechanism to turn the four upturned corners of the wrapper down one at a time over the top of the tablet.

17. A cutting, wrapping and labeling machine comprising a tablet cutting and feeding mechanism, a carrier adapted to receive the tablets therefrom, a second carrier, delivering mechanism adapted to transfer the tablet from the first carrier to the second, mechanism coöperating with said delivery mechanism to partially wrap the tablet in transit from the first carrier to the second, mechanism adapted to complete the folding of the wrapper, a movable label magazine, mechanism for producing intermittent rotation, means to transmit intermittent motion from said mechanism to said carriers and said label magazine, and intermittently acting labeling mechanism the operation of which is timed with relation to the intervals of motion of said second carrier and said label magazine and acting to apply labels over the folds on a face of said wrapper, thereby completing the wrapping of the article.

18. A wrapping and labeling machine comprising a train of intermeshing gears, a power shaft adapted to rotate continuously during the operation of the machine, gearing adapted to connect said train of gears to the power shaft intermittently, whereby step-by-step rotation is imparted to said train of gears, a separate shaft on which each gear of said train is mounted, a carrier mounted on one of said shafts and adapted to transport the articles to be wrapped, a second carrier mounted on another of said shafts, means to transfer the articles to be wrapped from the first to the second carrier and partially wrap them in transit between said carriers, a label magazine mounted on another one of said shafts, and intermittently acting mechanism adapted to deliver labels from said magazine to the wrapped articles in said second carrier, and apply them over folds on a face of said wrapper whereby the wrapping of the article is completed, and means to eject the wrapped and labeled articles from said second carrier.

19. A wrapping and labeling machine, comprising an intermittently rotating carrier having a plurality of pockets carrying articles in different stages of the wrapping and labeling process, means to impart step-by-step rotating motion to said carrier, wrapping means to fold the wrapper down on the article in one of the stopping positions of said carrier, means to apply a coat of adhesive material over one face of the wrapper at another stopping position of said carrier, label applying mechanism acting intermittently and timed to apply a label to the coated face of said tablet at another stopping position of said article, to complete the wrapping thereof, ejecting means timed to eject said wrapped and labeled article from said carrier at another stopping position thereof, and an intermittent drive common to all of said mechanisms.

20. A wrapping and labeling machine, comprising an intermittently rotating carrier having a plurality of pockets carrying articles in different stages of the wrapping and labeling process, means to impart step-by-step rotating motion to said carrier, wrapping means to fold the wrapper down on the article in one of the stopping positions of said carrier, means to apply a coat of adhesive material over one face of the wrapper at another stopping position of said carrier, and label applying mechanism acting intermittently and timed to apply a label to the coated face of said tablet at another stopping position of said article, to complete the wrapping thereof, and ejecting means timed to eject said wrapped and labeled article from said carrier at another stopping position thereof, a power shaft rotating continuously during the operation of the machine, mechanism connecting the said wrapping, spreading, labeling and ejecting mechanisms to said continuously rotating shaft and timing said wrapping, spreading, labeling and ejecting mechanisms to act with respect to the intermittent rotation of said carrier, and an intermittent drive common to all said mechanisms.

21. In a wrapping machine, a frame having a plurality of openings therein, means to feed wrapping material to the first of an elongated strip upon said frame, a plurality of movable fingers adapted to crease the wrapping material into said openings, mechanism to operate said fingers, and mechanism to automatically cut the said strip into proper lengths to form wrappers.

22. In a wrapping machine, the combination with a frame adapted to support the wrapping material with the article to be wrapped placed thereon, the said frame having an opening registering with the position the article occupies on the wrapper, said opening having slots or lateral openings radiating therefrom, means comprising a plurality of movable fingers adapted to engage the said wrapper at different points around the article and crease the same at such points into said radial slots, mechanism to operate said fingers, and means to force the said article and wrapper through the first named opening in said frame.

23. In a wrapping machine, the combination with a frame adapted to support the wrapping material together with the article to be wrapped placed thereon, said frame having an opening registering with the position the article occupies on said material and also having lateral slots or openings radiating from said first named opening, a plate mounted for movement toward and away from said frame, a plurality of fingers carried by said plate and registering respectively with said lateral slots, intermittently acting means adapted to force said plate toward said frame and thereby cause said fingers to indent the wrapping material into said lateral slots, a spring to cause said plate and fingers to recede from said position, and means to force said article and wrapper through the first named opening in said frame and to thereby fold the wrapper about said article.

24. A wrapping machine, comprising an opened cornered chute, means to feed wrapping material into position over said chute, positioning means adapted to bring the articles to be wrapped successively into a predetermined position with relation to said wrapping material and in alinement with said chute, a plurality of movable fingers adapted to engage said wrapping material and indent the same into the corner openings of said chute, means to operate said fingers periodically, and means to push said article with its wrapper through said chute.

25. In a wrapping machine, the combination with a reel carrying a roll of wrapping material of a plurality of feed rollers between which said material travels, means to impart step-by-step rotation to said rollers to feed said material forward periodically, a reciprocating knife adapted to shear said wrapping material off directly after each forward step thereof, a plurality of fingers adapted to descend upon and hold said material while being cut, mechanism to place an article to be wrapped on the wrapping material fed forward of said rollers, and mechanism to fold said wrapping material about said article.

26. A wrapping machine, comprising a supporting member for the wrapping material, having an opening therein adapted to register with the article to be wrapped placed upon said material, mechanism to feed wrapping material onto said support, means acting to indent and hold said material against movement in the plane of its travel after said material has been fed into position on said support, and then withdraw from the same, and mechanism acting subsequently to the withdrawal of said holding means to push said article and its wrapper into said opening.

27. A wrapping machine, comprising a supporting member on which the wrapping material is adapted to rest, said member having an opening adapted to register with the article to be wrapped placed upon the wrapper, mechanism to indent said wrapper while on said support at points to correspond to subsequent folds therein, and means acting subsequently to said indenting means to push said article and wrapper into said opening, whereby said folds are formed.

28. A wrapping machine, comprising a support upon which the wrapping material is adapted to rest, said support having an opening provided with a plurality of radial slots, mechanism to indent said material into said slots, and mechanism acting subsequently to said indenting mechanism to push an article placed upon said material over said opening, together with said material, into said opening, folded wings being formed on said wrapper at points corresponding to said indentations.

29. A wrapping machine, comprising a member having an opening therethrough provided with radial slots, the said member comprising a support for wrapping material placed thereon and the article to be wrapped placed upon the said material above said opening, mechanism comprising a plurality of movable fingers adapted to indent said wrapping material into said slots, and mechanism acting subsequently to said indenting mechanism to push said article and wrapper into said opening.

30. A wrapping machine, comprising a support upon which a piece of wrapping material is adapted to rest, said support having an opening provided with a plurality of radial slots, mechanism to feed wrapping material onto said support and over said opening, mechanism acting subsequently to said feeding operation to indent said material into said slots, and cutting mechanism operating while the indenting mechanism is in engagement with said material, to cut the wrapper into the desired length.

31. In a wrapping machine, the combination with a carrier having an opening for the reception of articles to be wrapped, a portion of the walls of said opening being movable, mechanism to automatically operate said movable portion to enlarge said opening, feeding mechanism adapted to deliver the material into said opening when so enlarged, and means to return the movable wall of said opening to its normal position after the entry of said material thereinto, whereby the material is gripped between the fixed and movable walls of said opening.

32. In a wrapping machine, the combination with a carrier having an opening through it for the reception of articles to be wrapped, a portion of the walls of said opening being movable, mechanism to automatically operate said movable portion to enlarge said opening, feeding mechanism adapted to deliver the material into said opening when so enlarged, a movable platform, mechanism to raise said platform into proximity to said opening to receive material delivered thereto, and means to return the movable wall of said opening to its normal position after the entry of said material thereinto, whereby the material is gripped between the fixed and movable walls of said opening.

33. A wrapping machine, comprising a wrapping member having a plurality of fingers, and mechanism to move said member bodily across one face of the partially wrapped article in a plurality of different directions, whereby said fingers are brought into engagement respectively with different portions of the wrapper which they fold down on the article.

In testimony whereof I affix my signature in presence of two witnesses.

RUEL A. JONES.

Witnesses:
D. J. DAVIS,
JOS. P. LOW.